(12) United States Patent
Yamada

(10) Patent No.: US 9,352,366 B2
(45) Date of Patent: May 31, 2016

(54) PLASTIC BOTTLE PROCESSING APPARATUS AND VEHICLE HAVING SAME MOUNTED THEREON

(71) Applicant: Susumu Yamada, Maibara (JP)

(72) Inventor: Susumu Yamada, Maibara (JP)

(*) Notice: Subject to any disclaimer, the term of this patent is extended or adjusted under 35 U.S.C. 154(b) by 0 days.

(21) Appl. No.: 14/538,935

(22) Filed: Nov. 12, 2014

(65) Prior Publication Data

US 2015/0143644 A1 May 28, 2015

(30) Foreign Application Priority Data

Nov. 22, 2013 (JP) ................................. 2013-241657
Nov. 22, 2013 (JP) ................................. 2013-241658

(51) Int. Cl.
*B08B 9/08* (2006.01)
*B29B 17/02* (2006.01)
*B29L 31/00* (2006.01)
*B29B 17/00* (2006.01)
*B29C 63/00* (2006.01)

(52) U.S. Cl.
CPC ................. *B08B 9/083* (2013.01); *B29B 17/02* (2013.01); *B29B 2017/0094* (2013.01); *B29B 2017/0255* (2013.01); *B29B 2017/0258* (2013.01); *B29C 63/0013* (2013.01); *B29L 2031/7158* (2013.01); *B29L 2031/744* (2013.01); *Y02W 30/622* (2015.05); *Y10S 156/921* (2013.01); *Y10S 156/936* (2013.01); *Y10T 156/1142* (2015.01); *Y10T 156/1153* (2015.01); *Y10T 156/1911* (2015.01)

(58) Field of Classification Search
CPC .................. B08B 9/083; B08B 9/0835; B29B 2017/0094; B29B 2017/0255; B29B 2017/0258; Y10S 156/921; Y10S 156/936
See application file for complete search history.

(56) References Cited

U.S. PATENT DOCUMENTS

| 4,013,497 | A | | 3/1977 | Wolf | |
|---|---|---|---|---|---|
| 4,033,804 | A | * | 7/1977 | Baldyga | B08B 9/083 156/153 |
| 4,325,775 | A | * | 4/1982 | Moeller | B08B 9/083 134/104.4 |

(Continued)

FOREIGN PATENT DOCUMENTS

| DE | 3504303 | 8/1986 |
|---|---|---|
| EP | 0698424 A1 | 2/1996 |

(Continued)

OTHER PUBLICATIONS

European Patent Appl. No. 14 00 3871—Search Report issued Jul. 24, 2015.

(Continued)

*Primary Examiner* — Mark A Osele
(74) *Attorney, Agent, or Firm* — Gerald Hespos; Michael Porco; Matthew Hespos

(57) ABSTRACT

A plastic bottle processing apparatus includes: an apparatus body having a conveying path section in which a plastic bottle is conveyed; and a label separating unit arranged in a middle of the conveying path section so as to separate a label from the plastic bottle. The label separating unit includes: a label cutting member that cuts the label of the plastic bottle, which is conveyed in the conveying path section along the axial direction of the plastic bottle; a heating member that heats the label cut by the label cutting member; and a brush member disposed so as to be able to make contact with the label heated by the heating member and remove the label from the plastic bottle body by making contact with the label.

18 Claims, 20 Drawing Sheets

(56) References Cited

U.S. PATENT DOCUMENTS

| | | | | |
|---|---|---|---|---|
| 4,726,535 | A * | 2/1988 | Snyder | B03B 9/061 241/101.2 |
| 4,834,826 | A * | 5/1989 | Abe | B08B 9/083 156/250 |
| 5,152,865 | A * | 10/1992 | Hurst | B08B 9/083 15/236.01 |
| 6,199,615 | B1 | 3/2001 | Klarl | |
| 7,909,278 | B2 * | 3/2011 | Yamada | B65F 3/00 241/101.74 |
| 8,322,395 | B2 * | 12/2012 | Hurst | B08B 9/083 15/236.01 |
| D680,335 | S * | 4/2013 | Wales | D4/131 |

FOREIGN PATENT DOCUMENTS

| | | |
|---|---|---|
| JP | S4315328 Y | 6/1968 |
| JP | 58118207 | 7/1983 |
| JP | H8112577 A | 5/1996 |
| JP | H10146832 A | 6/1998 |
| JP | H11099523 A | 4/1999 |
| JP | H11512972 A | 11/1999 |
| JP | 2003103520 A | 4/2003 |
| JP | 2003252317 A | 9/2003 |
| JP | 2005087873 A | 4/2005 |
| JP | 2006035060 A | 2/2006 |
| JP | 2008073964 A | 4/2008 |
| JP | 2010-253417 | 11/2010 |
| KR | 100930624 | 12/2009 |
| WO | 2009048227 A1 | 4/2009 |

OTHER PUBLICATIONS

Japanese Office Action 2013-241657 Dated Mar. 8, 2016.
Japanese Office Action 2013-241658 Dated Mar. 8, 2016.

* cited by examiner

PLASTIC BOTTLE PROCESSING APPARATUS AND VEHICLE HAVING SAME MOUNTED THEREON

TECHNICAL FIELD

The present invention relates to a plastic bottle processing apparatus for processing waste plastic bottles and a vehicle having the plastic bottle processing apparatus mounted thereon.

BACKGROUND ART

Vehicles for processing waste plastic bottles are conventionally known, and for example, Japanese Unexamined Patent Publication No. 2010-253417 discloses a self-propelled vehicle having a waste recycling function. The self-propelled vehicle disclosed in Japanese Unexamined Patent Publication No. 2010-253417 sequentially segments a plastic bottle having a label wound around a plastic bottle body along an axial direction thereof while simultaneously cutting the label during the segmentation so that the label can be separated from the plastic bottle body. The segmented bottle bodies are compressed by a compressing device and the separated labels are absorbed by a suction device provided on a lateral side of the compressing device, whereby the separated labels are collected independently from the segmented plastic bottle bodies.

However, even when the label is cut together with the plastic bottle body, the cut labels often adhere to the cut bottle bodies due to static electricity. Thus, even when labels are absorbed by the suction device as in the self-propelled vehicle disclosed in Japanese Unexamined Patent Publication No. 2010-253417, it is difficult to collect the separated labels independently from the segmented bottle bodies.

SUMMARY OF INVENTION

An object of the present invention is to provide a plastic bottle processing apparatus capable of separating a label from a plastic bottle body easily and reliably, and a vehicle having such plastic bottle processing apparatus mounted thereon.

The present invention provides a plastic bottle processing apparatus that processes a plastic bottle having a label wound around a plastic bottle body, including: an apparatus body having a conveying path section in which the plastic bottle is conveyed along an axial direction of the plastic bottle; and a label separating unit arranged in a middle of the conveying path section so as to separate the label from the plastic bottle body, wherein the label separating unit includes: a label cutting member that cuts the label of the plastic bottle, which is conveyed in the conveying path section, along the axial direction of the plastic bottle; a heating member that heats the label cut by the label cutting member; and a brush member that removes the label from the plastic bottle body by making contact with the label heated by the heating member.

DESCRIPTION OF EMBODIMENTS

Figure 1:
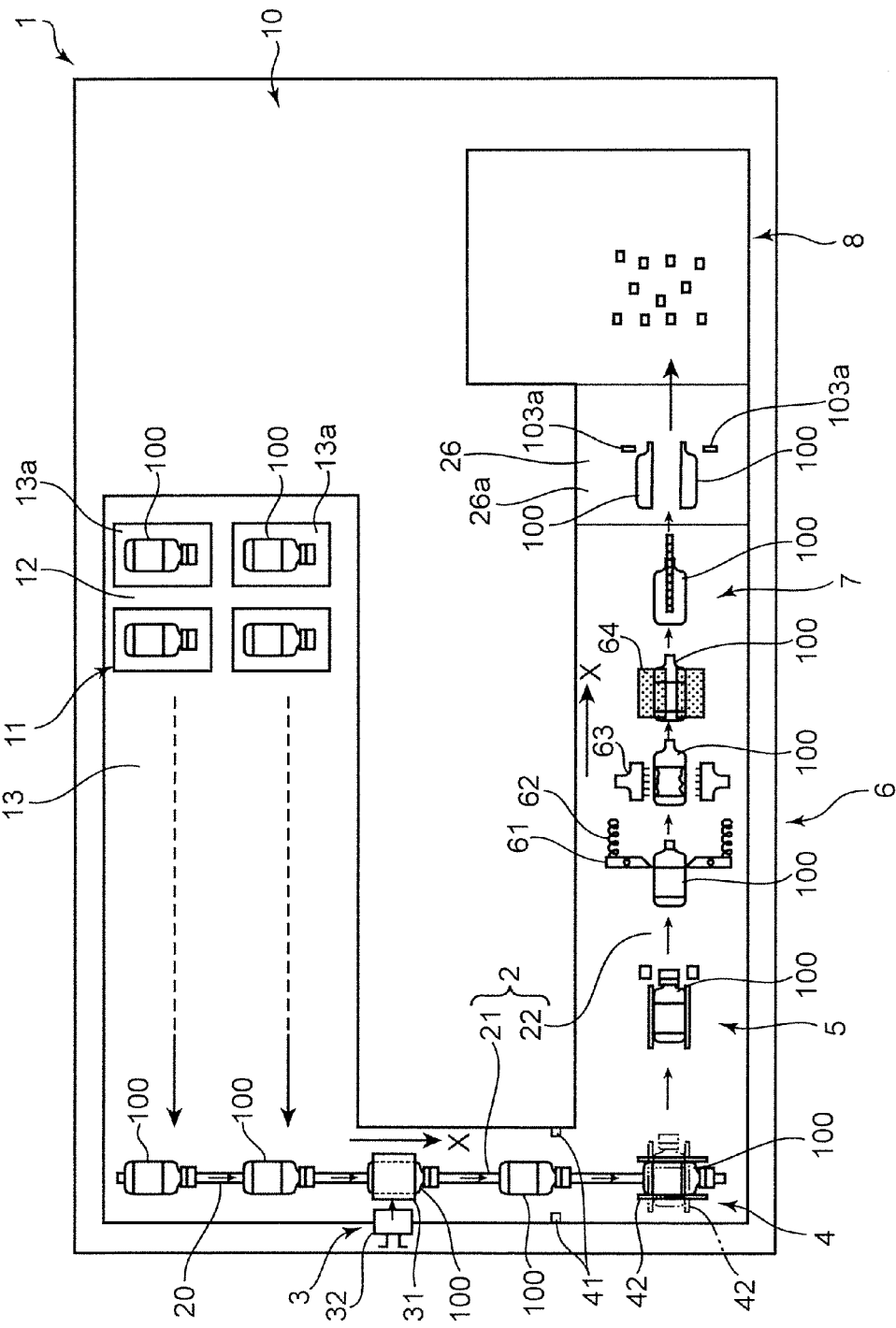
FIG. 1 is a plan view of a plastic bottle processing apparatus according to an embodiment of the present invention.

Hereinafter, embodiments of the present invention will be described in detail with reference to the drawings. FIG. 1 is a schematic plan view of a plastic bottle processing apparatus according to an embodiment of the present invention. An X-direction in the drawing indicates a conveying direction of a plastic bottle. Moreover, in the following description, a downstream side in the conveying direction of the plastic bottle is referred to as a forward side (front side) and an upstream side is referred to as a backward side (rear side). Moreover, a conveying direction of the plastic bottle is often referred to simply as a conveying direction.

Figure 3:
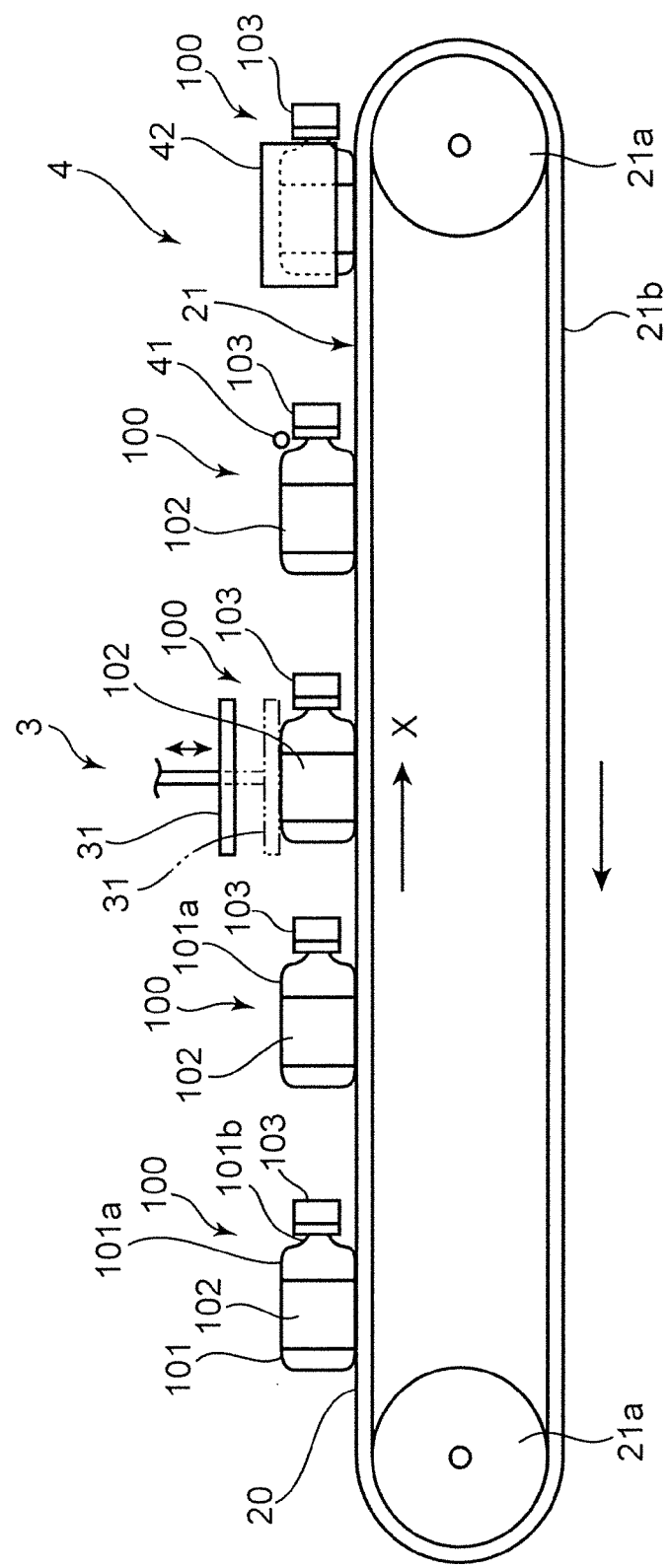
FIG. 3 is a side view of a first conveying path part of the plastic bottle processing apparatus.
Figure 4:
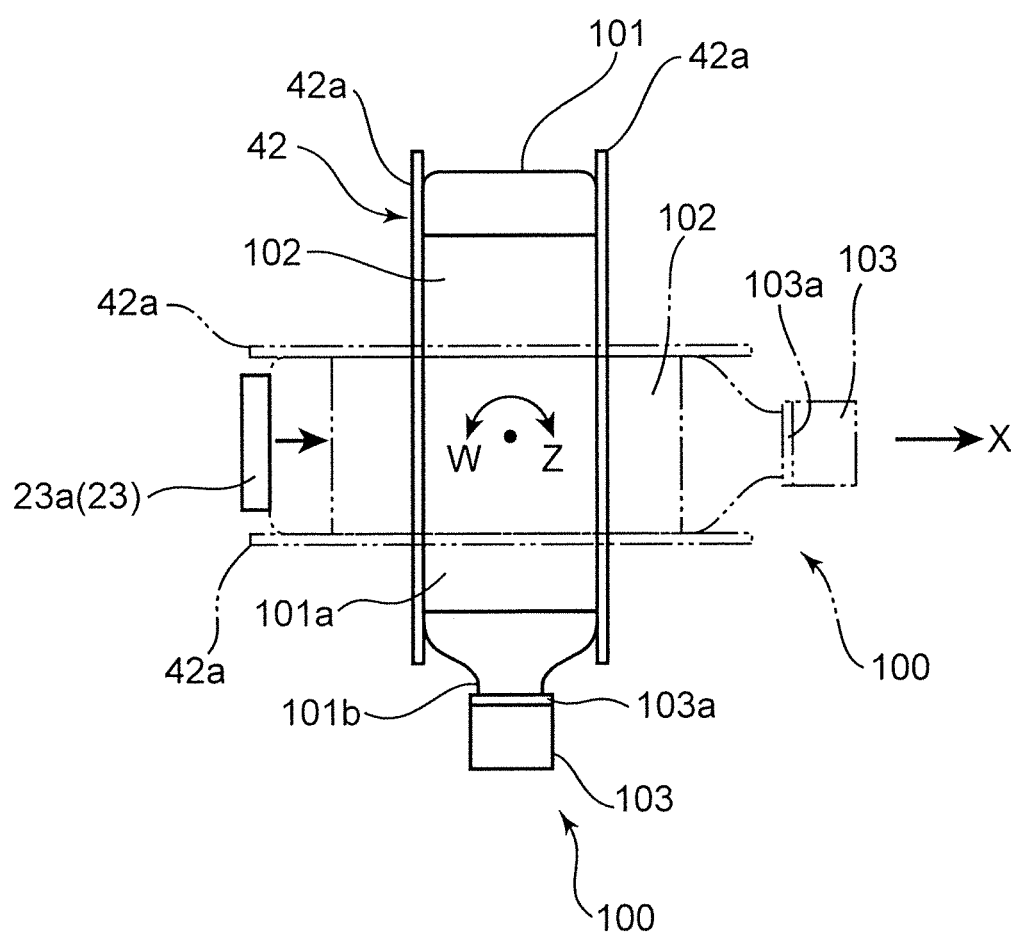
FIG. 4 is a plan view of a direction adjustment member and a second conveying member (first pressing member) of the plastic bottle processing apparatus.

The processing subject processed by a plastic bottle processing apparatus 1 of the present embodiment is a plastic bottle 100 as illustrated in FIGS. 3 and 4. The plastic bottle 100 includes a plastic bottle body 101 having a body portion 101*a* and an opening portion 101*b* and a cap 103 screwed into the opening portion 101*b*. A label 102 is wound around the body portion 101*a* of the plastic bottle body 101.

For example, the plastic bottle body 101 is formed from polyethylene terephthalate (PET), the cap 103 is formed from polypropylene(PP), and the label 102 is formed from polystyrene (PS).

The plastic bottle processing apparatus 1 performs a series of processes of separating the plastic bottle 100 into the plastic bottle body 101, the cap 103, a cap ring 103a separated from the cap 103, and the label 102 and shredding the plastic bottle body 101. According to this definition, the plastic bottle body 101 is a body obtained by removing the cap 103 from the plastic bottle 100. However, in the following description, the body is appropriately referred to as the plastic bottle 100 for the convenience's sake.

As illustrated in FIG. 1, the plastic bottle processing apparatus 1 of the present embodiment includes an apparatus body 10, a feeding unit 11, a non-subject container eliminating unit 3, a direction adjustment unit 4, a cap removing unit 5, a label separating unit 6, a segmenting unit 7, and a shredding unit 8.

The apparatus body 10 includes a conveying path section 2 for allowing the plastic bottle 100 to be conveyed from the feeding unit 11 to the shredding unit 8. In the present embodiment, the conveying path section 2 includes a first conveying path part 21 and a second conveying path part 22.

As illustrated in FIGS. 1 and 3, a first conveying member 20 that conveys the plastic bottle 100 along the first conveying path part 21 is provided in the first conveying path part 21. In the present embodiment, the first conveying member 20 is a chain conveyor that includes a pair of wheels 21a and an endless chain 21b wound around the wheels 21a. The first conveying member 20 moves the chain 21b so as to rotate with driving of one wheel 21a. With movement of the chain 21b, the plastic bottle 100 placed on the chain 21b is conveyed from a starting end of the first conveying path part 21 via the non-subject container eliminating unit 3 to the direction adjustment unit 4 in the X-direction of FIG. 3.

As illustrated in FIG. 1, the second conveying path part 22 is arranged on a rear end side of the first conveying path part 21 so as to cross the first conveying path part 21 approximately vertically. Moreover, second to fifth conveying members 23 to 26 that convey the plastic bottle 100 along the second conveying path part 22 are provided in the second conveying path part 22.

The second conveying member 23 conveys the plastic bottle 100 from the starting end (the position of the direction adjustment unit 4) of the second conveying path part 22 illustrated in FIG. 1 to the cap removing unit 5. As illustrated in FIG. 4, the second conveying member 23 includes a first planar pressing member 23a.

The first pressing member 23a is arranged so as to be movable along the second conveying path part 22 and is driven by a driving device (not illustrated) so as to move in the X-direction (rightward) of FIGS. 1 and 4. The first pressing member 23a presses the rear end surface of the plastic bottle 100 with the movement in the X-direction. In this way, the plastic bottle 100 is conveyed in the X-direction.

Figure 8:
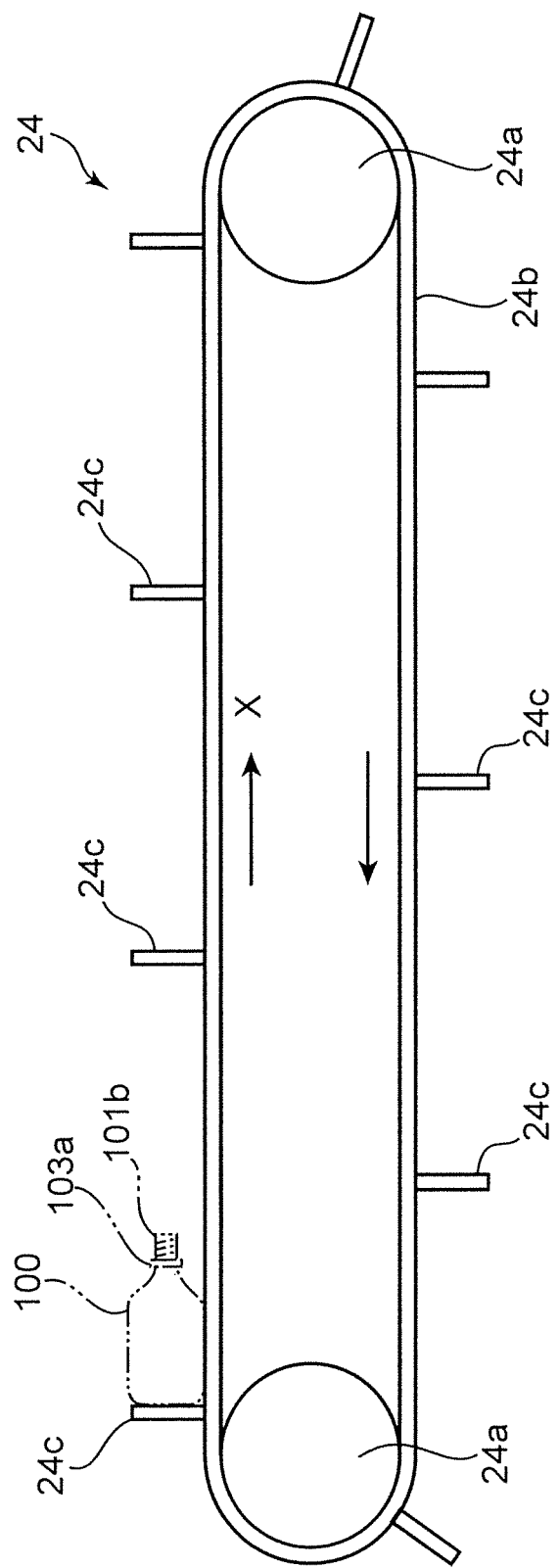
FIG. 8 is a side view of a third conveying path part of the plastic bottle processing apparatus.

The third conveying member 24 conveys the plastic bottle 100 from the cap removing unit 5 along the second conveying path part 22 to a position where the plastic bottle 100 passes through the label separating unit 6. As illustrated in FIG. 8, in the present embodiment, the third conveying member 24 is a chain conveyor that includes a pair of wheels 24a and an endless chain 24b wound around the wheels 24a. Moreover, the third conveying member 24 includes a plurality of second pressing members 24c arranged at predetermined intervals in the longitudinal direction of the endless chain 24b.

The respective second pressing members 24c are attached to the outer surface of the chain 24b so as to protrude outward from the outer surface of the chain 24b.

The third conveying member 24 moves the chain 24b so as to rotate in the X-direction of FIG. 8 with driving of one wheel 24a. With movement of the chain 24b, the second pressing member 24c presses the rear end surface of the plastic bottle 100. In this way, the plastic bottle 100 is conveyed in the X-direction.

Figure 14A:
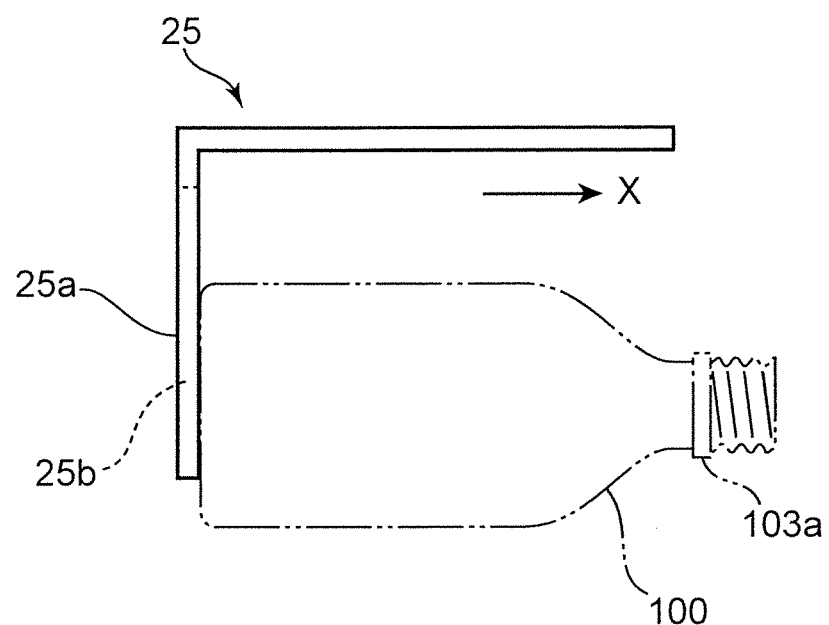
FIG. 14A is a side view of a fourth conveying member (third pressing member) of the plastic bottle processing apparatus.
Figure 14B:
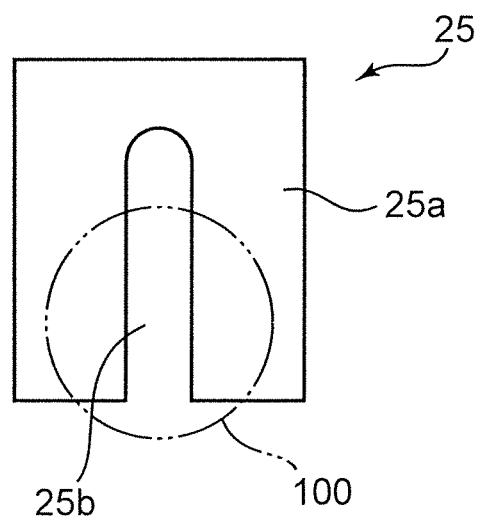
FIG. 14B is a rear view of the fourth conveying member (third pressing member)

The fourth conveying member 25 conveys the plastic bottle body 101 from the label separating unit 6 to a position where the plastic bottle body 101 passes through the segmenting unit 7. As illustrated in FIGS. 14A and 14B, the fourth conveying member 25 includes a third planar pressing member 25a arranged so as to be movable along the second conveying path part 22. The third pressing member 25a includes a segmenting wheel passing groove 25b through which the segmenting wheel 72 of the segmenting unit 7 (described later) pass.

The fourth conveying member 25 is driven by a driving device (not illustrated) so as to move in the X-direction of FIG. 14A. With the movement, the third pressing member 25a presses the rear end surface of the plastic bottle 100, and as a result, the plastic bottle 100 is conveyed in the X-direction.

As illustrated in FIG. 1, the fifth conveying member 26 conveys the segmented bottle bodies 101 from the segmenting unit 7 to the shredding unit 8.

In the present embodiment, the fifth conveying member 26 is a belt conveyor that includes wheels (not illustrated) and an endless belt 26a wound around the wheels. The belt conveyor moves the belt 26a so as to rotate with driving of the wheels to convey the segmented bottle bodies 101 placed on the belt 26a to the shredding unit 8 with movement of the belt 26a.

Next, the feeding unit 11 will be described. The feeding unit 11 includes a feeding opening 12 into which the plastic bottle 100 is fed and a conveying path feeding conveyor 13 that sequentially feeds the plastic bottles 100 fed into the feeding openings 12 to the conveying path section 2 (first conveying path part 21).

Figure 2:
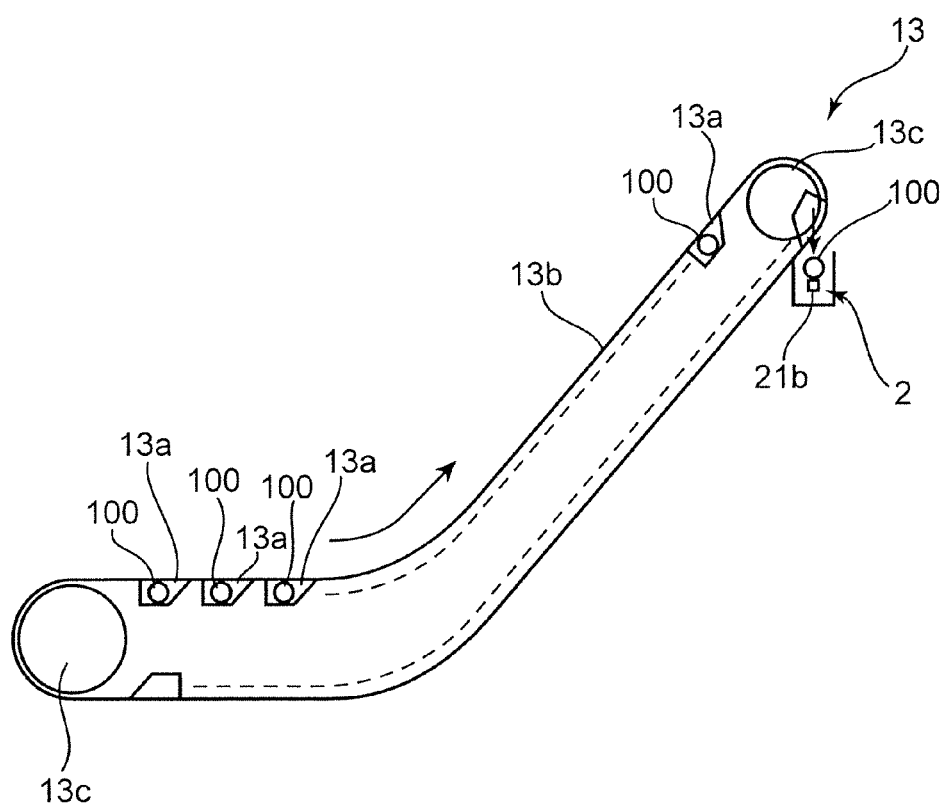
FIG. 2 is a side view of a conveying path feeding conveyor in a feeding unit of the plastic bottle processing apparatus.

As illustrated in FIG. 2, the conveying path feeding conveyor 13 includes a plurality of receiving members 13a for receiving the plastic bottle 100 to be conveyed and a transferring member 13b that transfers the receiving members 13a.

In the present embodiment, the receiving members 13a are arranged in two lines as illustrated in FIG. 1. The receiving members 13a in each line are arranged approximately at equal intervals and are connected to the transferring member 13b. Moreover, the receiving member 13a of the present embodiment is formed in such a size that a subject larger than a processing subject is not received therein.

As illustrated in FIG. 2, the transferring member 13b is an endless chain wound around wheels 13c. When the transferring member 13b rotates, the receiving members 13a are consecutively moved from the feeding opening 12 to a position above the conveying path section 2 (first conveying path part 21). With movement of the receiving member 13a, the plastic bottle 100 received in the receiving member 13a is fed to the conveying path section 2 (first conveying path part 21).

The non-subject container eliminating unit 3 eliminates non-processing subject containers such as can containers and plastic bottles other than predetermined processing subject plastic bottles. As illustrated in FIG. 1, the non-subject container eliminating unit 3 includes a diameter checking sensor 31 that checks whether an subject conveyed is the plastic bottle 100 which is a processing subject based on the diameter of a body portion of the container conveyed (referred to as a conveying subject) and an eliminating member 32 that moves non-processing subject containers to the outside of the conveying path section 2.

As illustrated in FIG. 3, in the present embodiment, the diameter checking sensor 31 is arranged above the first conveying path part 21 so as to be movable in an up-down direction. The diameter checking sensor 31 makes contact with the body portion of a conveying subject conveyed along the first conveying path part 21 to measure the diameter thereof and checks whether the diameter is within a predetermined range.

As illustrated in FIG. 1, the eliminating member 32 is arranged on a lateral side of the first conveying path part 21 and on the lower side of the diameter checking sensor 31. The eliminating member 32 is arranged so as to be movable in a direction perpendicular to the conveying direction of the first conveying path part 21 so as to cross the first conveying path part 21 from the lateral side of the first conveying path part 21.

When the conveying subject is a non-processing subject container, the eliminating member 32 pushes the non-processing subject container to the outside of the first conveying path part 21 from the lateral side of the first conveying path part 21 based on height information detected by the diameter checking sensor 31.

The direction adjustment unit 4 adjusts the direction of the plastic bottle 100 conveyed along the first conveying path part 21. That is, the direction adjustment unit 4 checks whether the cap 103 of the plastic bottle 100 is on the front side of the conveying direction and adjusts the direction of the plastic bottle 100 so that the cap 103 is on the front side of the conveying direction.

As illustrated in FIG. 3, the direction adjustment unit 4 of the present embodiment includes a direction checking sensor 41 arranged on the front side of the non-subject container eliminating unit 3 in the conveying direction of the first conveying path part 21 and a direction adjustment member 42 arranged on the front side of the direction checking sensor 41 in the conveying direction.

In the present embodiment, the direction checking sensor 41 is configured as an optical sensor. The direction checking sensor 41 includes a light emitting portion and a light receiving portion disposed with the first conveying path part 21 interposed and is arranged so that light passes through a position on the outer side of the opening portion 101b of the plastic bottle 100. That is, the direction checking sensor 41 checks the direction of the plastic bottle 100 based on a light reception state of the light receiving portion, of the light emitted from the light emitting portion.

As illustrated in FIG. 4, the direction adjustment member 42 includes a pair of planar holding members 42a that faces each other while sandwiching the body portion 101a of the plastic bottle 100 from both sides. These holding members 42a are movable toward and away from each other in a radial direction of the body portion 101a and are arranged so as to be integrally pivotable about an axis perpendicular to the conveying direction.

Figure 5:
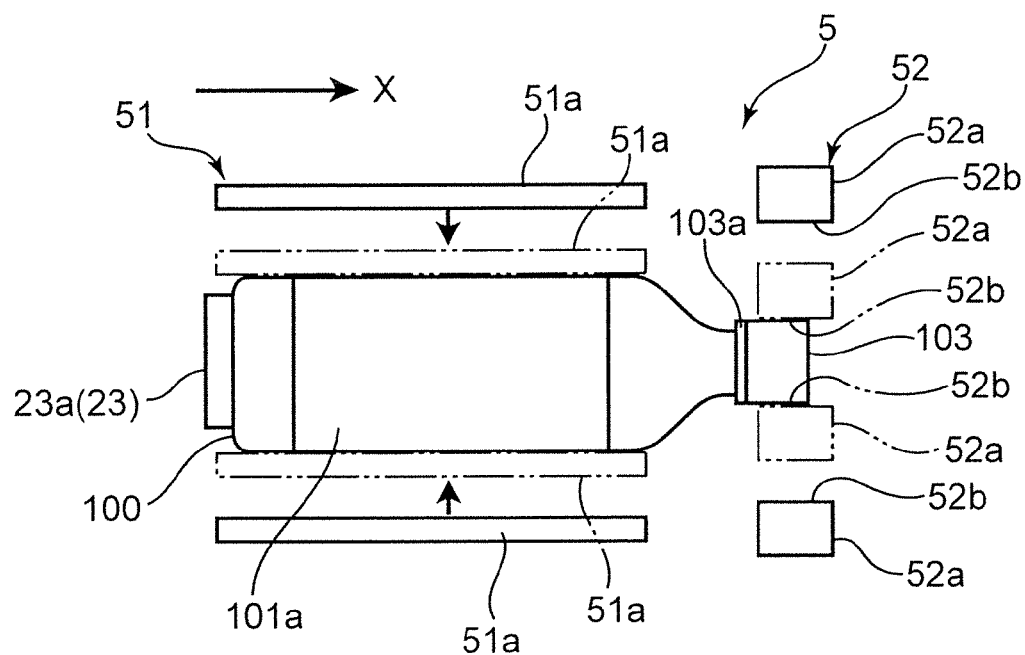
FIG. 5 is a plan view of a cap removing member of the plastic bottle processing apparatus.

The cap removing unit 5 removes the cap 103 of the plastic bottle 100 from the plastic bottle body 101. As illustrated in FIG. 1, the cap removing unit 5 is arranged on the starting end side of the second conveying path part 22. As illustrated in FIG. 5, the cap removing unit 5 includes a chuck member 51 that catches the body portion 101a of the plastic bottle 100 from both sides and a cap removal operating member 52 that removes the cap 103. In the present embodiment, the chuck member 51 and the cap removal operating member 52 correspond to a fixing member and a cap operating member of the present invention, respectively.

The chuck member 51 includes a pair of planar members 51a disposed at positions on both left and right sides of the second conveying path part 22, located on the outer side in the radial direction of the body portion 101a of the plastic bottle 100 so as to face each other. The pair of planar members 51a is movable toward and away from each other and sandwiches the body portion 101a of the plastic bottle 100 from both sides so as not to be rotatable with the movement toward each other. In this way, the chuck member 51 fixes the plastic bottle 100 in a state where the body portion 101a is caught.

Figure 6:
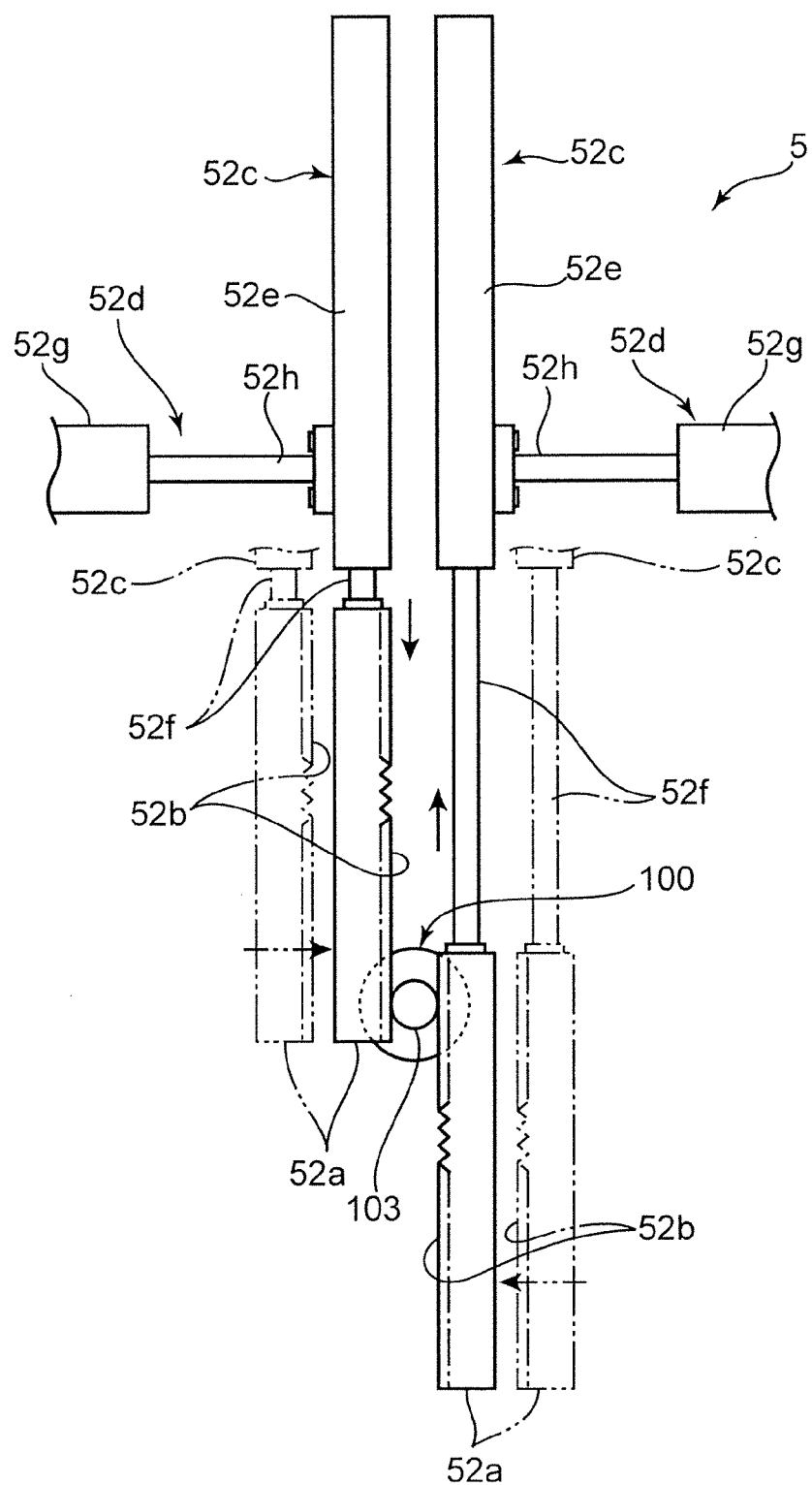
FIG. 6 is a front view of the cap removing member (before a cap is removed)

As illustrated in FIGS. 5 and 6, the cap removal operating member 52 includes two identical operating pieces 52a arranged at positions on both left and right sides of the second conveying path part 22, located on the front side of the chuck member 51 in the conveying direction so as to face each other and first movable operating members 52c and second movable operating members 52d that move the respective operating pieces 52a.

Each operating piece 52a is a long rod-shaped member having a quadrangular prism shape and has a contact portion 52b which is formed on the facing surface so as to make contact with the cap 103. The respective contact portions 52b face each other, and in the present embodiment, are formed in a convex-concave shape so that the contact portions 52b rarely slide on the outer circumferential surface of the cap 103.

The first movable operating members 52c move the operating piece 52a in the up-down direction. In the present embodiment, the first movable operating members 52c are air cylinders each including a first cylinder body 52e and a first rod 52f that is movably held on the first cylinder body 52e.

The first movable operating members 52c are arranged so that the first rod 52f moves in the up-down direction and the upper end of the operating piece 52a is connected to the lower end of the first rod 52f. Due to this, the operating piece 52a can move in the up-down direction together with the first rod 52f.

Two first movable operating members 52c operate the respective operating pieces 52a so as to move in vertically opposite directions. As will be described later, as illustrated in FIG. 6, when the cap 103 is removed, the operating piece 52a connected to the first movable operating member 52c on the left side is disposed above the operating piece 52a connected to the first movable operating member 52c on the right side, and the respective first movable operating members 52c are operated so that the left-side operating piece 52a moves downward and the right-side operating piece 52a moves upward. That is, in the present embodiment, these first movable operating members 52c correspond to a second driving member of the present invention.

The second movable operating members 52d move the operating pieces 52a in the left-right direction in which the operating pieces 52a move toward and away from each other. In the present embodiment, the second movable operating members 52d are air cylinders each including a second cylinder body 52g and a second rod 52h that is movably held on the second cylinder body 52g.

The second movable operating members 52d are arranged so that the second rod 52h moves in the left-right direction (the radial direction of the cap 103), and the first movable operating member 52c is connected to the distal end of the second rod 52h. Due to this, the first movable operating member 52c can move in the left-right direction together with the second rod 52h.

In the present embodiment, the two operating pieces 52a can move between a position at which the body portion 101a of the plastic bottle 100 is allowed to pass between the contact portions 52b and a position at which the distance between these contact portions 52b is slightly smaller than the diameter of the cap 103. The operating pieces 52a each moves with the operation of the second movable operating member 52d. That is, in the present embodiment, these second movable operating members 52d correspond to a first driving member of the present invention.

Next, the label separating unit 6 will be described. The label separating unit 6 is configured to remove the label 102 wound around the body portion 101a of the plastic bottle 100 from the plastic bottle body 101, and as illustrated in FIG. 1, is arranged in the second conveying path part 22 on the front side of the cap removing unit 5.

As illustrated in FIG. 1, the label separating unit 6 includes a label cutting member 61 that cuts the label 102, a biasing member 62 that biases the label cutting member 61, a heating member 63 arranged on the front side of the label cutting member 61, and a rotary brush member 64 arranged on the front side of the heating member 63.

Figure 9:
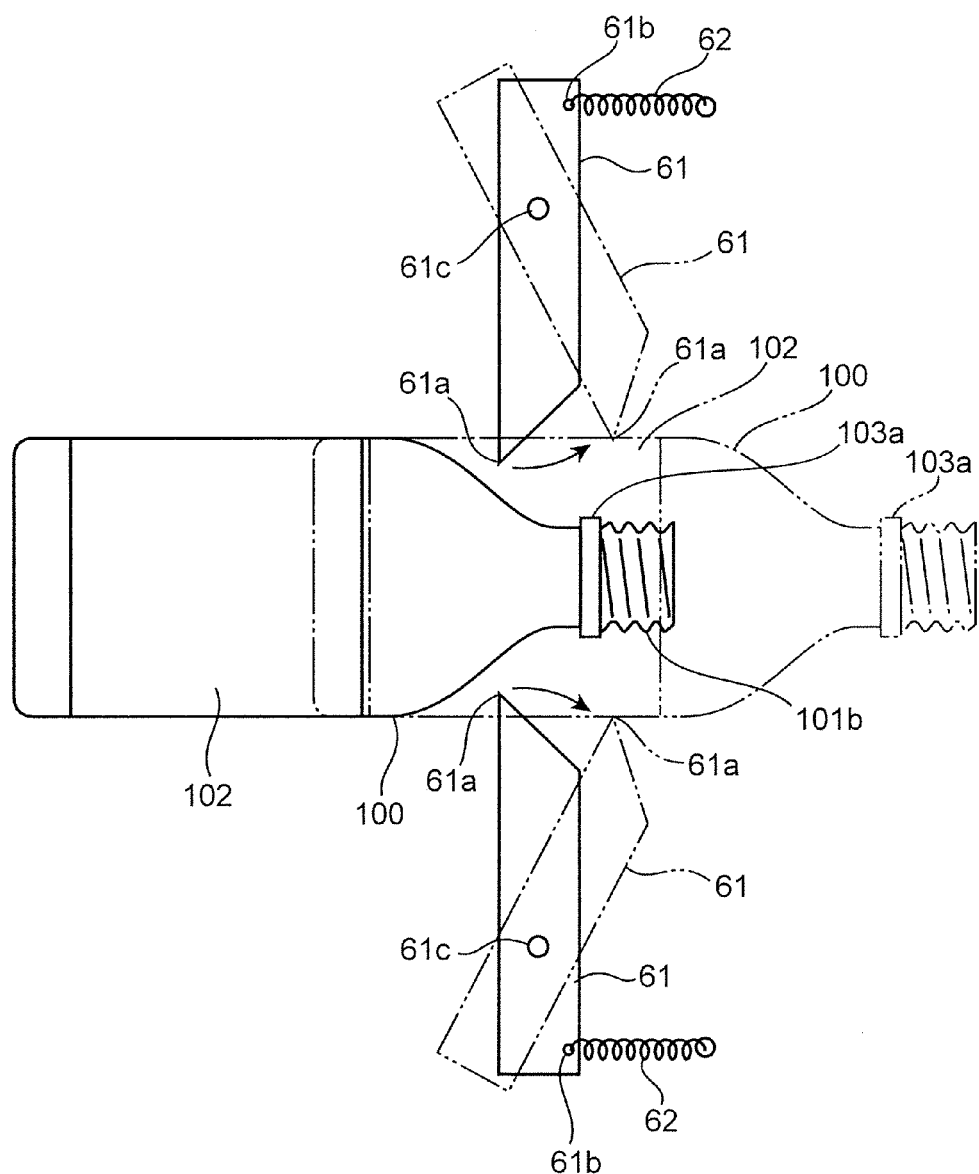
FIG. 9 is a plan view of a label cutting member and a plastic bottle in a label separating unit of the plastic bottle processing apparatus.

In the present embodiment, as illustrated in FIG. 9, the label cutting members 61 are arranged on both left and right sides of the second conveying path part 22. These label cutting members 61 have the same configuration. Each label cutting member 61 includes a blade portion 61a disposed on one end side thereof and a biasing member locking portion 61b which is disposed on the other end side and to which the biasing member 62 is locked. Moreover, the label cutting member 61 includes a connecting portion 61c disposed between the blade portion 61a and the biasing member locking portion 61b so as to be connected to the apparatus body 10.

The label cutting member 61 is supported on the apparatus body 10 with the connecting portion 61c interposed so as to be pivotable about an axis perpendicular to the conveying direction of the second conveying path part 22.

Due to this, the label cutting member 61 can pivot between a position (corresponding to a cutting position of the present invention) at which the blade portion 61a enters the second conveying path part 22 to make contact with the body portion 101a of the plastic bottle 100 conveyed along the second conveying path part 22 and a position (corresponding to a retracted position of the present invention) at which the blade portion 61a is outside the position and is disposed on the front side in the conveying direction of the plastic bottle body 101.

In the present embodiment, the biasing member 62 is a coil spring. The biasing member 62 has one end which is locked to the biasing member locking portion 61b of the label cutting member 61 and the other end which is locked to the apparatus body 10. Due to this, when the label cutting member 61 pivots toward the front side from the position (the position indicated by a solid line in FIG. 9) at which the blade portion 61a makes contact with the body portion 101a of the plastic bottle 100, the label cutting member 61 is biased to the original position which is on the rear side by the resilience of the biasing member 62.

Figure 10:
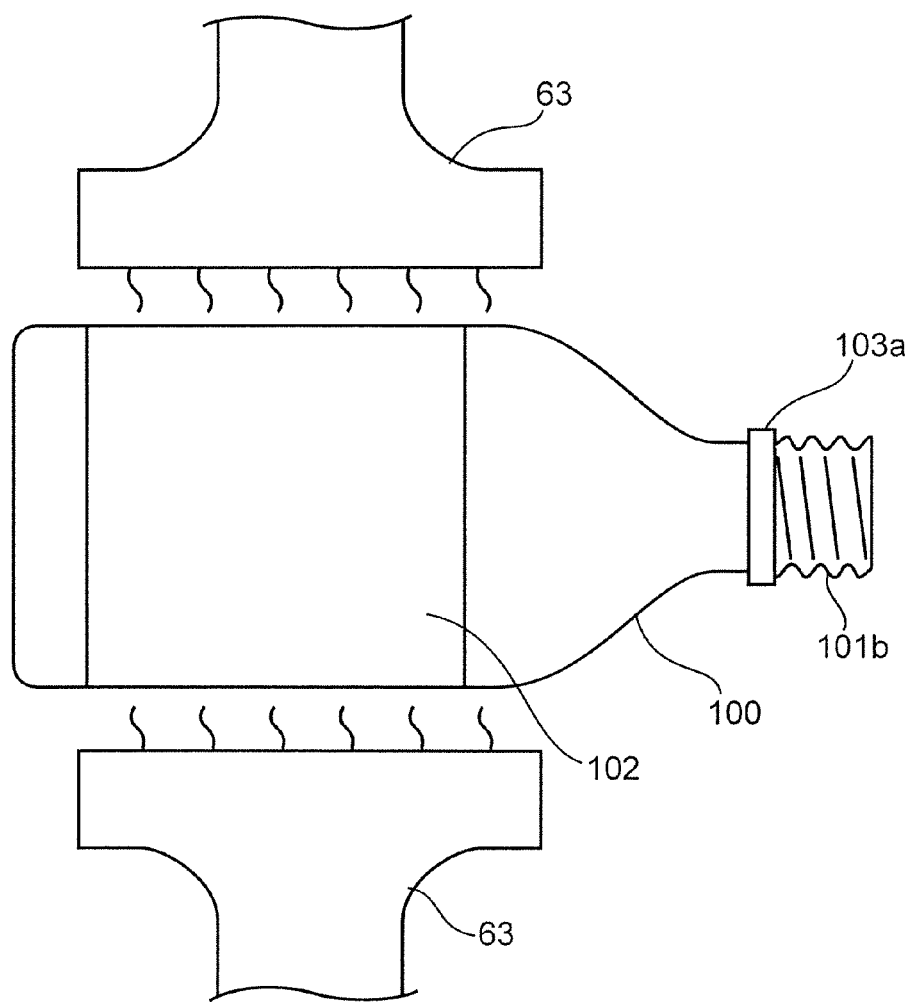
FIG. 10 is a plan view of a heating member and a plastic bottle in the label separating unit.

The heating member 63 is configured to heat a portion or the entire portion of the cut label 102 to thermally deform a portion or an entire portion of the label 102. In the present embodiment, as illustrated in FIG. 10, the heating members 63 are arranged on both left and right sides (on the outer side in the radial direction of the body portion 101a) of the second conveying path part 22. These heating members 63 have the same configuration.

Each heating member 63 is configured to emit hot air of approximately 70° C. to 90° C. to the cut parts (the parts cut by the label cutting member 61) of the label 102. The heating member 63 is not limited to a member that emits hot air, but an optional member that applies heat so that the cut label 102 is thermally deformed can be applied.

Figure 12:
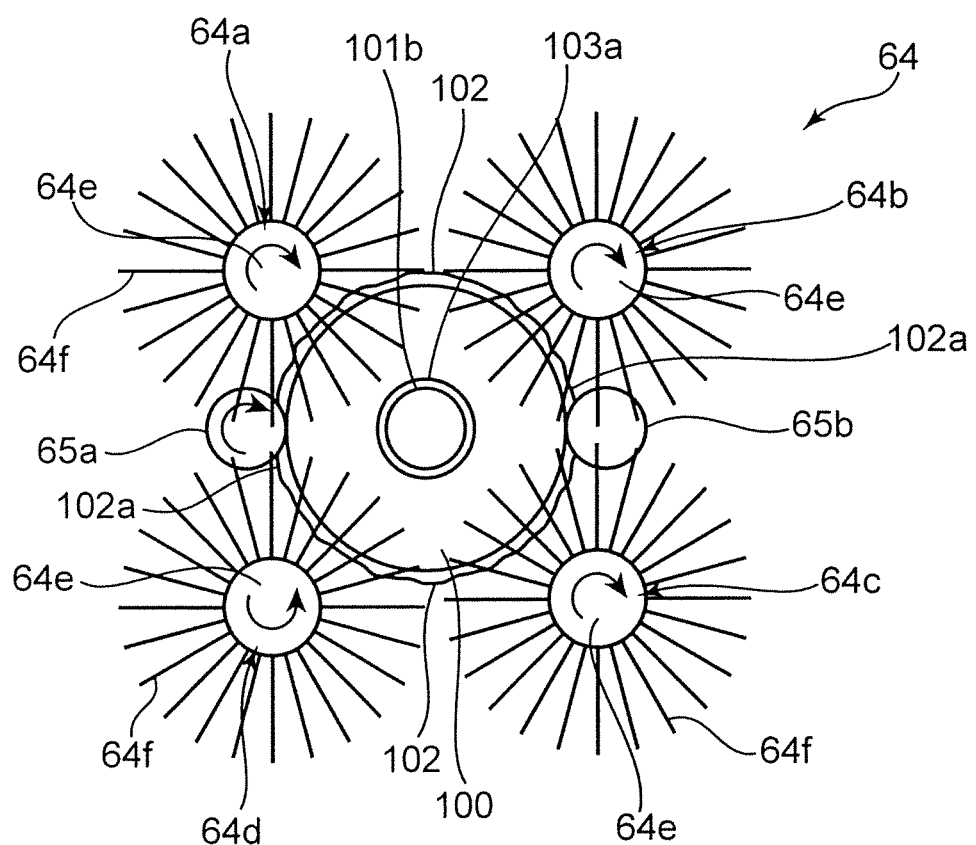
FIG. 12 is a front view of a plastic bottle and a rotary brush member of the label separating unit.

As illustrated in FIG. 12, the rotary brush member 64 includes a first rotary brush member 64a arranged on the top left side (the top left side when seen in an advancing direction) of the plastic bottle 100 conveyed along the second conveying path part 22, a second rotary brush member 64b arranged on the top right side, a third rotary brush member 64c arranged on the bottom right side, and a fourth rotary brush member 64d arranged on the bottom left side. These rotary brush members 64a to 64d have the same configuration.

Figure 13A:
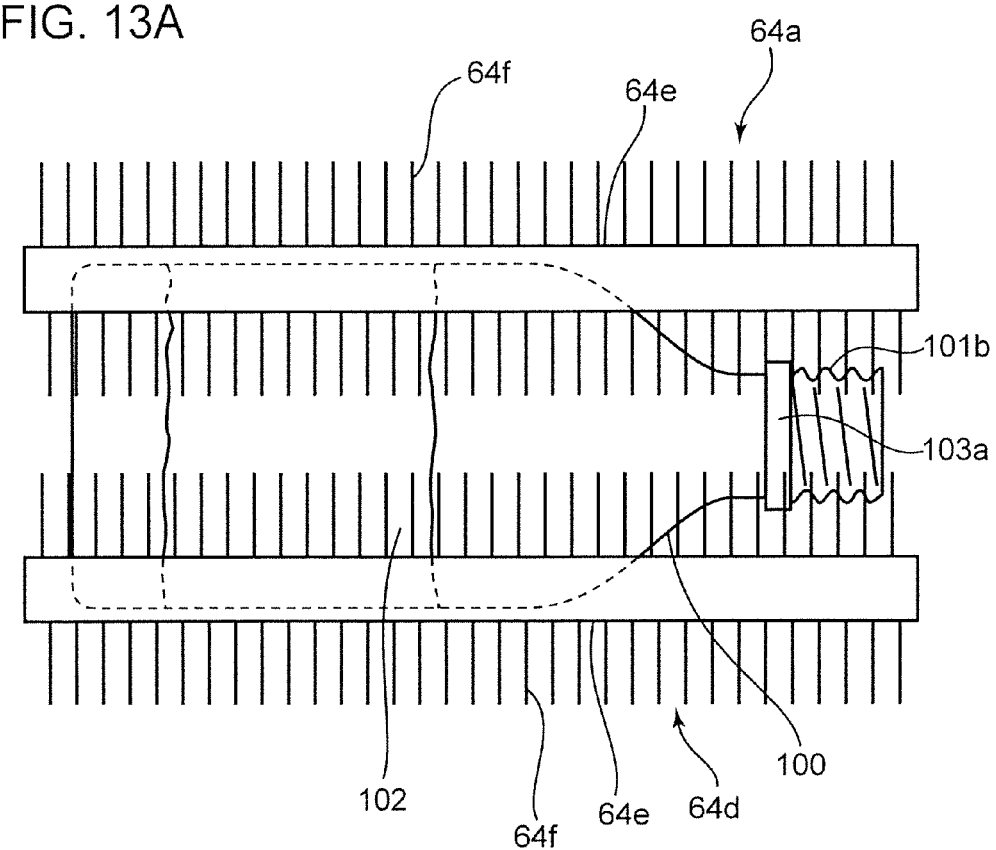
FIG. 13A is a plan view of a plastic bottle and the rotary brush member of the label separating unit.

As illustrated in FIG. 13A, the rotary brush members 64a to 64d each has a shaft portion 64e and brush bristles 64f arranged on the outer circumference of the shaft portion 64e and made from a synthetic resin such as nylon. The shaft portion 64e extends in the conveying direction of the second conveying path part 22 (that is, along an axial direction of the plastic bottle 100 conveyed along the second conveying path part 22). The rotary brush members 64a to 64d each is rotated about the axis (the shaft portion 64e) thereof when rotational driving force is applied to the shaft portion 64e from a motor (not illustrated) (corresponding to a rotating device of the present invention).

Moreover, in the present embodiment, the first, second, and third rotary brush members 64a, 64b, and 64c rotate clockwise in FIG. 12, and the fourth rotary brush member 64d rotates counterclockwise in FIG. 12.

Figure 13B:
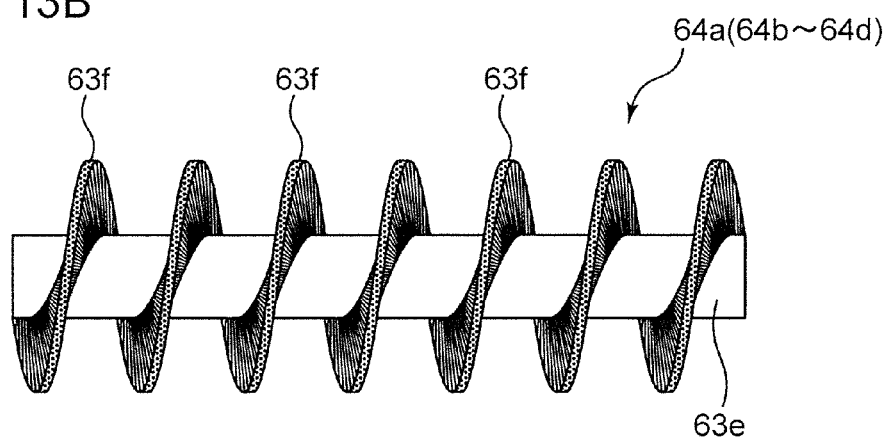
FIG. 13B is a side view of a modification of the rotary brush member.

The brush bristles 64f may be arranged on the entire outer circumferential surface of the shaft portion 64e, and for example, as illustrated in FIG. 13B, the brush bristles 64f may be arranged on the outer circumferential surface of the shaft portion 63e in a spiral form along the axial direction of the shaft portion 63e. In this case, the spiral brush bristles 64f may not be provided on all rotary brush members 64a to 64d, but may be provided on one to three of the rotary brush members 64a to 64d.

Moreover, in the present embodiment, as illustrated in FIG. 12, a first bottle guiding member 65a is provided between the first rotary brush member 64a and the fourth rotary brush member 64d, and a second bottle guiding member 65b is provided between the second rotary brush member 64b and the third rotary brush member 64c.

These bottle guiding members 65a and 65b are formed of a round bar-shaped member and are arranged approximately in parallel to the shaft portions 64e of the rotary brush members 64a to 64d so as to guide the plastic bottle 100 along the second conveying path part 22 with rotation of the rotary brush members 64a to 64d. Due to this, the plastic bottle 100 is prevented from deviating from the second conveying path part 22.

In the present embodiment, the first bottle guiding member 65a rotates in the same direction as the first rotary brush member 64a and rotates the plastic bottle 100 in the opposite direction with rotation of the first rotary brush member 64a.

In the present embodiment, although both the rotary brush members 64a to 64d and the plastic bottle 100 rotate as described above, any one of the rotary brush member and the plastic bottle 100 may be rotated and the other may not rotate.

Next, the segmenting unit 7 will be described. The segmenting unit 7 includes segmenting and sandwiching portions 71 illustrated in FIGS. 15 and 16 for sandwiching the plastic bottle body 101 and a segmenting wheel 72 illustrated in FIGS. 17 and 18 for segmenting the plastic bottle body 101 into two parts along the axial direction.

Figure 15:
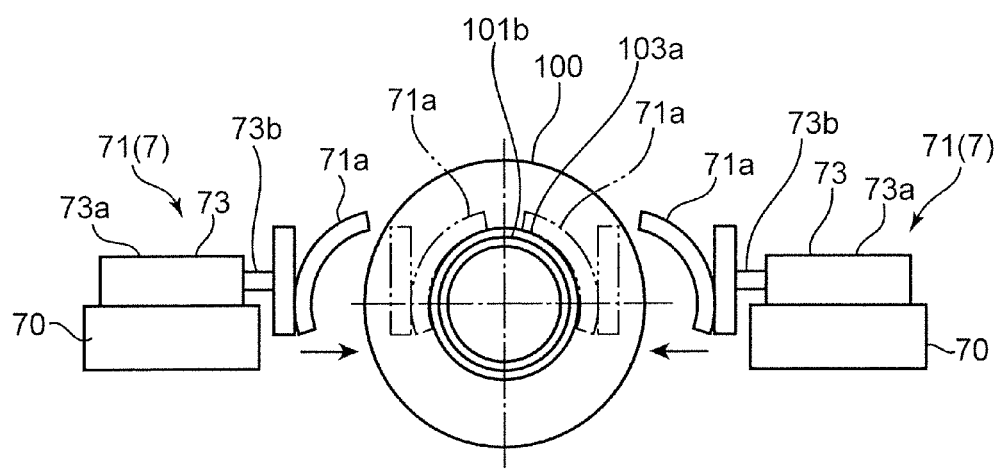
FIG. 15 is a front view of a plastic bottle and a segmenting and sandwiching portion of a segmenting unit of the plastic bottle processing apparatus.
Figure 16:
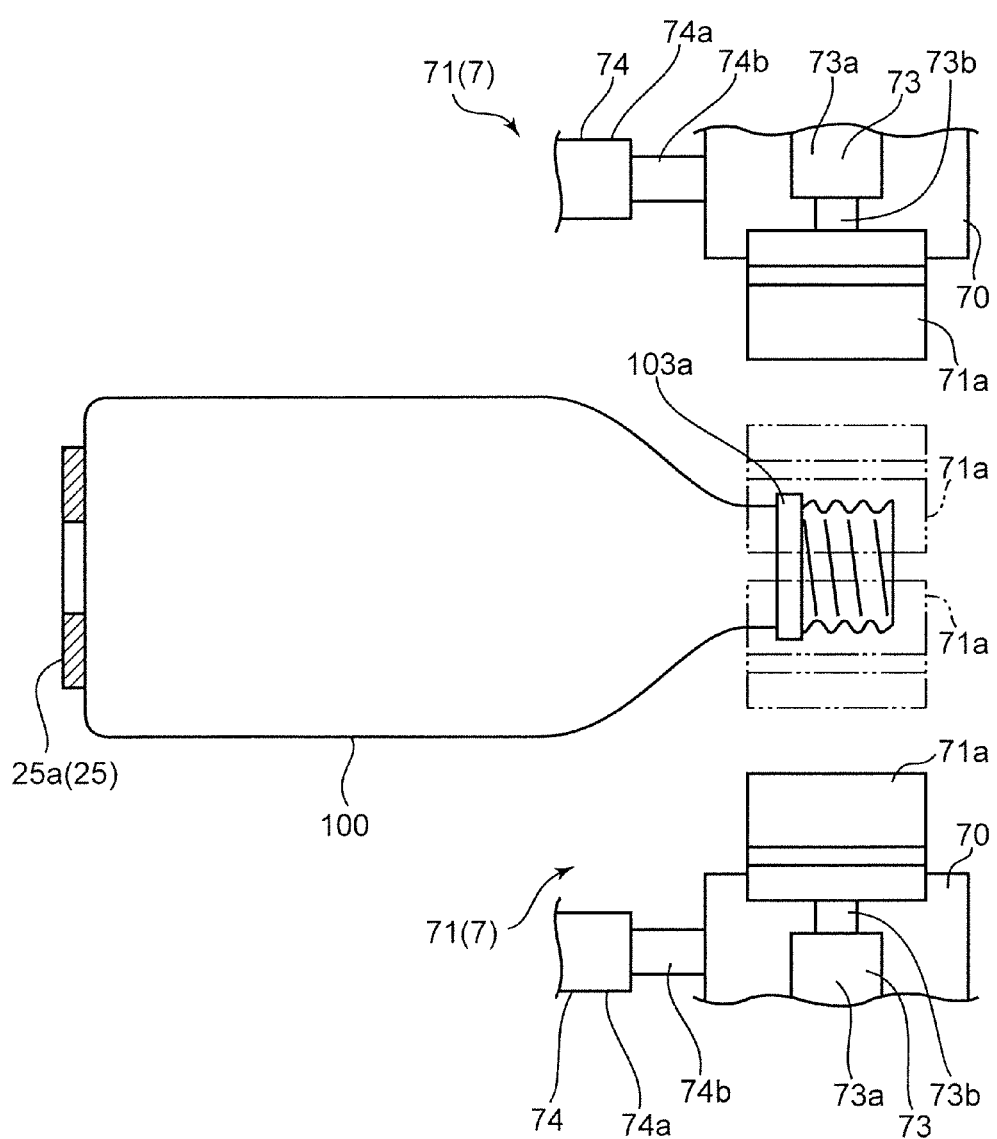
FIG. 16 is a plan view of a plastic bottle and the segmenting and sandwiching portion of the segmenting unit.

As illustrated in FIGS. 15 and 16, the segmenting and sandwiching portions 71 are arranged on both left and right sides of the second conveying path part 22. These segmenting and sandwiching portions 71 have the same configuration. In the present embodiment, each segmenting and sandwiching portion 71 includes sandwiching pieces 71a that sandwich the plastic bottle body 101 and first and second movement operating members 73 and 74 that move the sandwiching pieces 71a.

The sandwiching pieces 71a are formed in a circular arc shape extending along the outer circumference of the cap ring 103a and sandwich the opening portion 101b of the plastic bottle body 101 including the cap ring 103a.

The first movement operating member 73 moves the sandwiching piece 71a in the left-right direction (the radial direction of the opening portion 101b) perpendicular to the conveying direction of the second conveying path part 22. In the present embodiment, the first movement operating member 73 is an air cylinder that includes a first movement operating member body 73a and a first movement operating member rod 73b movably held on the first movement operating member body 73a.

The first movement operating member body 73a is attached to a stand 70 that is provided on the apparatus body 10 so as to be movable in the conveying direction. The sandwiching piece 71a is connected to the distal end of the first movement operating member rod 73b. Due to this, the first movement operating member 73 moves the sandwiching piece 71a in the left-right direction perpendicular to the conveying direction of the second conveying path part 22 with movement of the first movement operating member rod 73b.

The second movement operating member 74 moves the sandwiching piece 71a along the conveying direction of the second conveying path part 22. In the present embodiment, the second movement operating member 74 is an air cylinder that includes a second movement operating member body 74a and a second movement operating member rod 74b movably provided on the second movement operating member body 74a.

The second movement operating member body 74a is fixed to the apparatus body 10. The stand 70 is connected to the distal end of the second movement operating member rod 74b. Due to this, the second movement operating member 74 moves the stand 70 in the conveying direction of the second conveying path part 22 with movement of the second movement operating member rod 74b and moves the sandwiching piece 71a along the conveying direction of the second conveying path part 22 with the aid of the stand 70 with movement of the stand 70.

Figure 17:
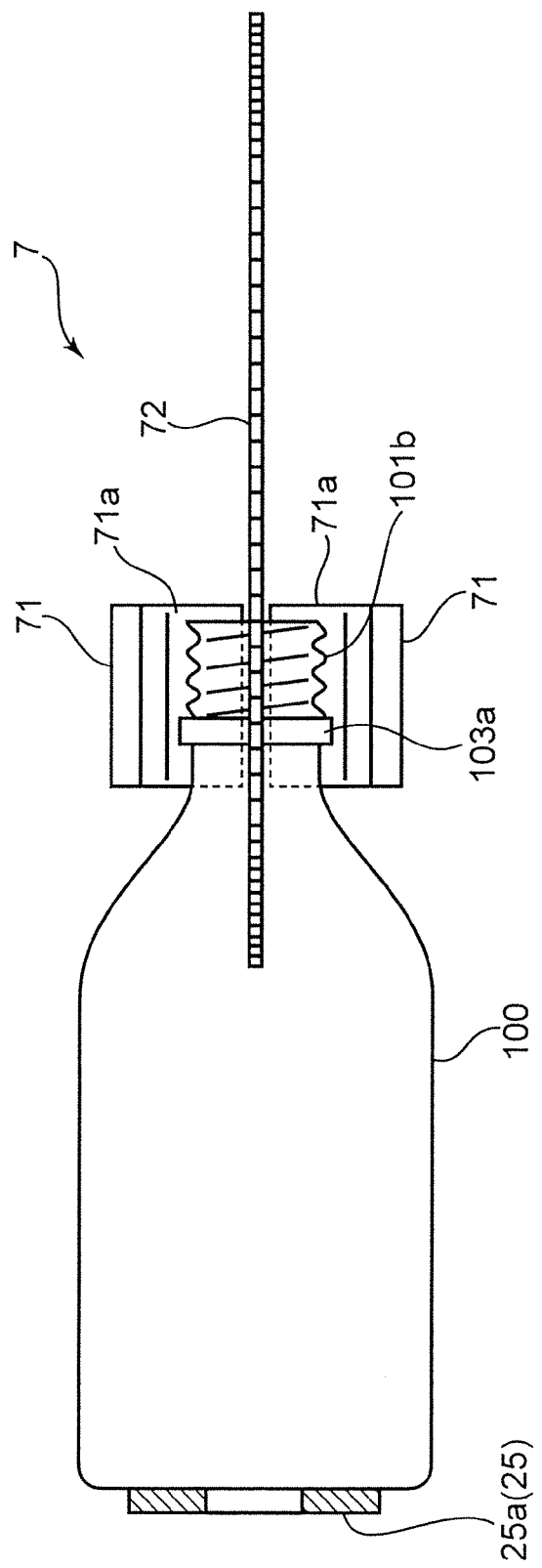
FIG. 17 is a plan view of a plastic bottle and a segmenting wheel of the segmenting unit.
Figure 18:
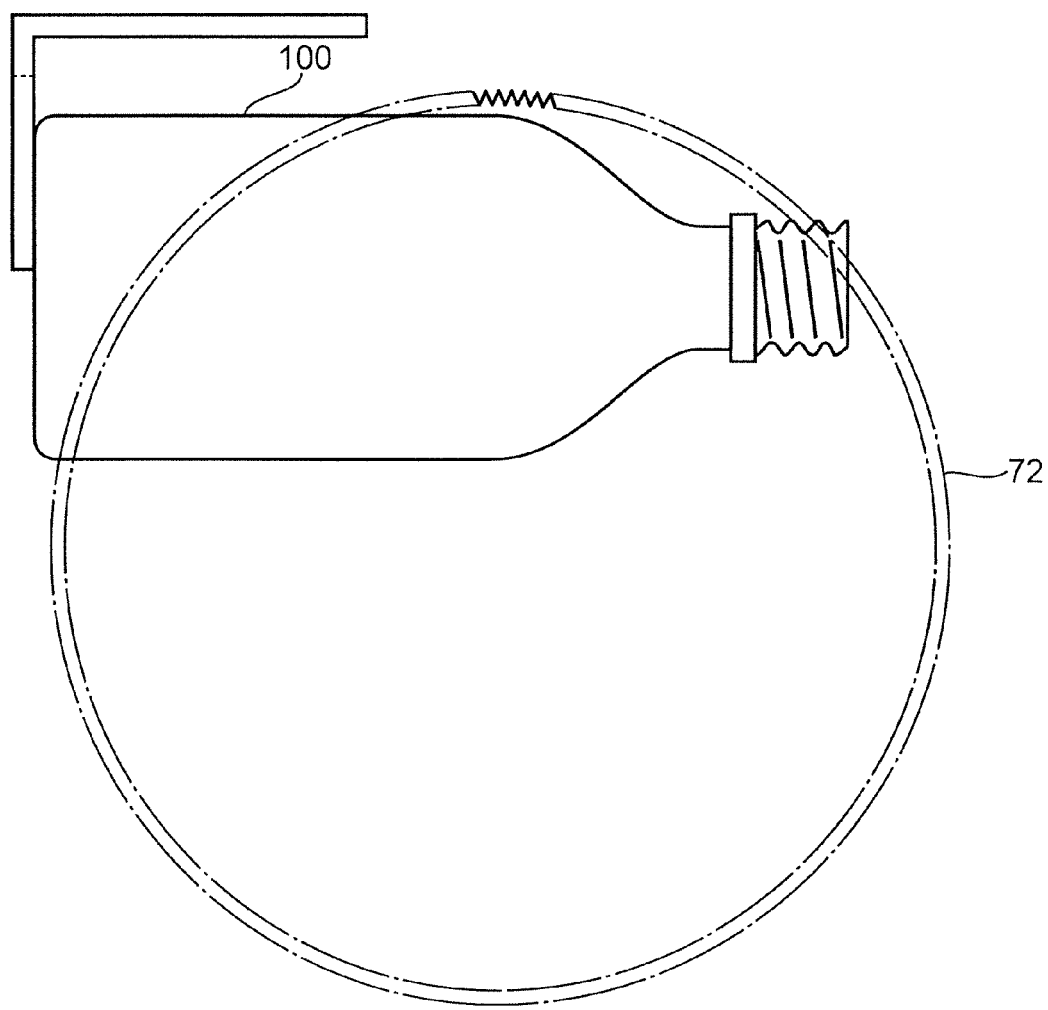
FIG. 18 is a side view of a plastic bottle and the segmenting wheel of the segmenting unit.

In the present embodiment, the segmenting wheel 72 is formed as a round saw wheel as illustrated in FIGS. 17 and 18 and are rotated by a motor (not illustrated) so as to segment the plastic bottle body 101 along the axial direction with the rotation.

Next, the shredding unit 8 will be described. The shredding unit 8 is arranged on the rear side of the segmenting unit 7 in the second conveying path part 22 and a terminating end of the second conveying path part 22. The shredding unit 8 shreds the plastic bottle body 101 segmented into two parts by the segmenting wheel 72 into very small pieces.

Figure 19:
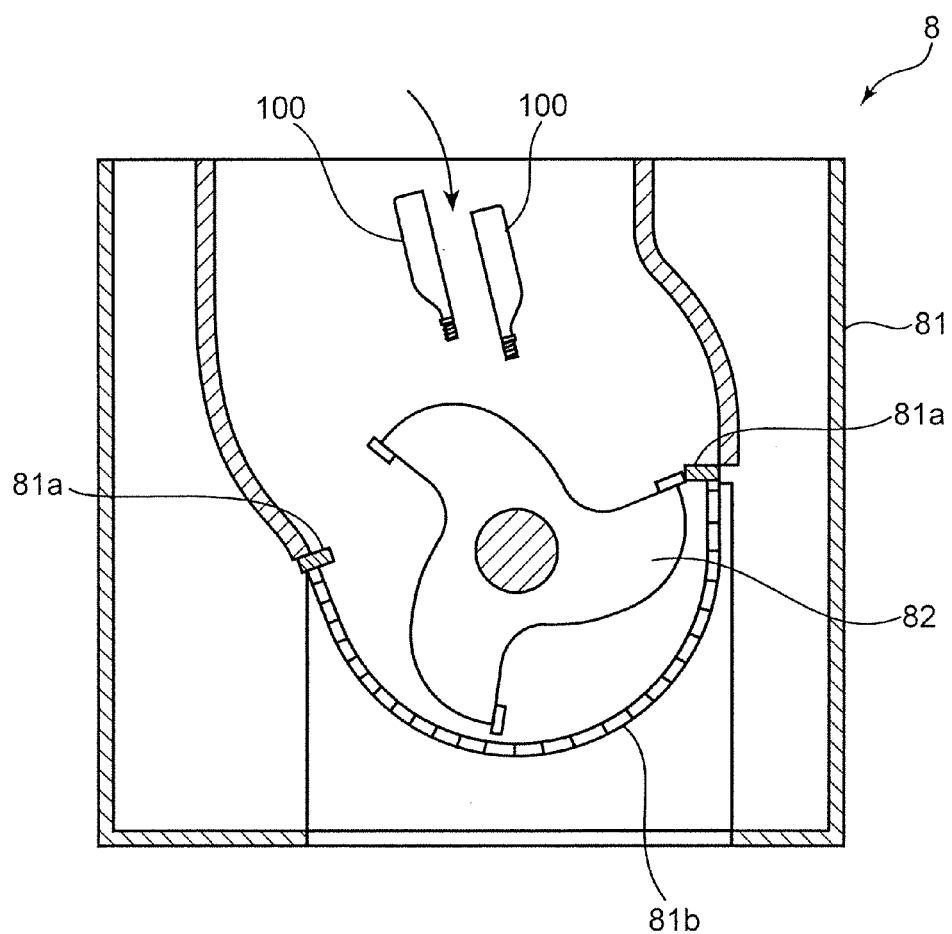
FIG. 19 is a schematic view illustrating an inner structure of a shredding device of the plastic bottle processing apparatus.

As illustrated in FIG. 19, the shredding unit 8 includes a casing 81 and a rotary blade member 82 rotatably arranged inside the casing 81. The casing 81 includes a fixed blade 81a on the inner circumferential wall, and the segmented bottle bodies 101 are shredded by the fixed blade 81a and the rotary blade member 82.

The casing 81 includes a net-shaped sieving portion 81b disposed on the lower side of the rotary blade member 82 so that chip pieces shredded in a predetermined size are collected from the holes in the sieving portion 81b.

In the present embodiment, the holes of the sieving portion 81b are formed in a rectangular shape of which each side is approximately 10 mm, and chip pieces shredded in a size of 10 mm or smaller can pass through the holes.

The plastic bottle processing apparatus 1 includes a control device based on a known microcomputer, and the operations of various members, conveyors, and the like of the non-subject container eliminating unit 3, the direction adjustment unit 4, the cap removing unit 5, the label separating unit 6, the segmenting unit 7, and the shredding unit 8 are controlled integrally by this control device.

Next, the operation of the plastic bottle processing apparatus 1 based on the control of this control device will be described.

When the plastic bottle 100 is fed into the feeding opening 12, the plastic bottle 100 enters and is received in any one of the receiving members 13a of the conveying path feeding conveyor 13.

In this case, a plastic bottle larger than a processing subject does not enter the receiving member 13a and is not conveyed up to the first conveying path part 21. More specifically, in the present embodiment, the plastic bottle 100 having a volume of 500 mL is set as the processing subject and the 500-mL plastic bottle 100 is received in the receiving member 13a. However, 1000 mL and 2000-mL plastic bottles do not enter the receiving member 13a. Due to this, a plastic bottle (non-processing subject container) larger than the processing subject is not conveyed up to the first conveying path part 21.

The plastic bottle 100 received in the receiving member 13a is transferred to a position above the first conveying path part 21 with movement of the transferring member 13b and is fed to the first conveying path part 21 so as to fall on the first conveying member 20.

The plastic bottle 100 fed into the first conveying path part 21 is carried on the chain 21b of the first conveying member 20 (see FIG. 2) and is intermittently conveyed toward the front side along the first conveying path part 21 together with the chain 21b with movement of the chain 21b.

When the plastic bottle 100 is moved up to the non-subject container eliminating unit 3, the diameter checking sensor 31 moves downward to make contact with the body portion 101a of the plastic bottle 100 as illustrated in FIG. 3. The non-subject container eliminating unit 3 determines whether the plastic bottle 100 is a processing subject plastic bottle based on the height position information of the diameter checking sensor 31 that is in contact with the body portion 101a.

When it is determined that the plastic bottle 100 is the processing subject plastic bottle, the non-subject container eliminating unit 3 allows the plastic bottle 100 to be conveyed further without eliminating the same.

On the other hand, when it is determined that the plastic bottle 100 is not the processing subject plastic bottle, the non-subject container eliminating unit 3 operates the eliminating member 32 (illustrated in FIG. 1) to push the conveying subject (non-processing subject container) from the lateral side of the first conveying path part 21 to the outside of the first conveying path part 21.

In the present embodiment, as described above, the plastic bottle 100 having a volume of 500 mL is set as the processing subject. When the conveying subject is a 250-mL coffee can container, for example, the eliminating member 32 eliminates the coffee can container by pushing the coffee can container from the lateral side of the first conveying path part 21 to the outside of the first conveying path part 21 based on the height position information of the diameter checking sensor 31 moved down until the sensor makes contact with the coffee can container.

That is, since non-processing subject containers such as a plastic bottle larger than a processing subject plastic bottle are eliminated by the conveying path feeding conveyor 13, the non-processing subject containers are not fed to the first conveying path part 21 as explained above. However, since non-processing subject containers such as a plastic bottle or a can container smaller than the processing subject plastic bottle cannot be eliminated by the conveying path feeding conveyor 13, the non-processing subject containers are fed to the first conveying path part 21. The non-subject container eliminating unit 3 mainly eliminates such a non-processing subject container smaller than the processing subject plastic bottle fed into the first conveying path part 21 in this manner.

When the plastic bottle 100 is conveyed to the direction adjustment unit 4, the direction adjustment unit 4 determines whether the opening portion 101b (the cap 103) of the plastic bottle 100 is positioned on the front side based on the checking information of the direction checking sensor 41.

Moreover, the direction adjustment unit 4 holds the plastic bottle 100 by the holding member 42a sandwiching the plastic bottle 100. When it is determined that the opening portion 101b (the cap 103) of the plastic bottle 100 is positioned on the front side, the direction adjustment unit 4 pivots the holding member 42a by 90° in the counterclockwise direction (the direction indicated by W in the drawing), as illustrated in FIG. 4. In this way, the direction adjustment unit 4 adjusts the direction of the plastic bottle 100 so that the opening portion 101b (the cap 103) is on the front side of the second conveying path part 22.

On the other hand, when it is determined that the opening portion 101b (the cap 103) of the plastic bottle 100 is not positioned on the front side, the direction adjustment unit 4 causes the holding member 42a to pivot by 90° in the clockwise direction (the direction indicated by Z in the drawing) to adjust the direction of the plastic bottle 100 so that the opening portion 101b (the cap 103) is on the front side of the second conveying path part 22.

The plastic bottle 100 of which the direction is adjusted is conveyed up to the position of the cap removing unit 5 by the second conveying member 23 and is set at such a position that the cap 103 is disposed between the two operating pieces 52a of the cap removal operating member 52. The first pressing member 23a of the second conveying member 23 returns to the original position and conveys the next plastic bottle 100 up to the cap removing unit 5 after the plastic bottle 100 is conveyed up to the cap removing unit 5.

When the plastic bottle 100 is conveyed up to the cap removing unit 5, both left and right sides of the body portion 101a is caught by the chuck member 51. Moreover, both left and right sides of the cap 103 are sandwiched by the pair of operating pieces 52a of the cap removal operating member 52. Specifically, the second movable operating member 52d operates and the two operating pieces 52a of the cap removal operating member 52 move toward each other to make contact with the cap 103 from both sides. In this case, as illustrated in FIG. 6, the operating piece 52a positioned on the downstream side (the left side in FIG. 6) in the cap removing direction (counterclockwise direction) among the two operating pieces 52a is set to the upper position, and the operating piece 52a positioned on the upstream side (the right side in FIG. 6) in the cap removing direction is set to the lower position. In this way, the lower end of the contact portion 52b of the operating piece 52a on one side (the left side in FIG. 6) and the upper end of the contact portion 52b of the operating piece 52a on the other side (the right side in FIG. 6) make contact with the cap 103.

Figure 7:
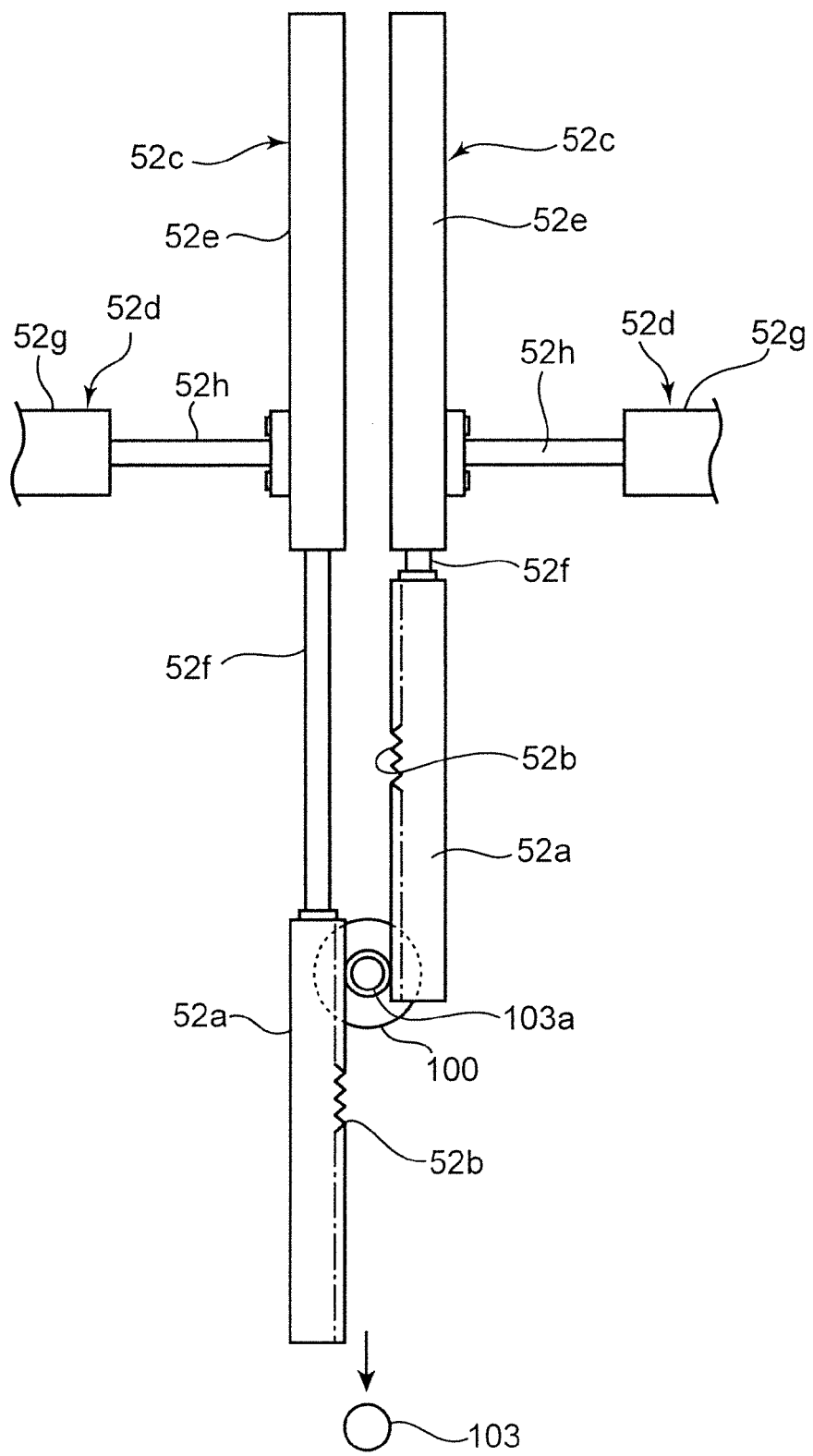
FIG. 7 is a front view of the cap removing member (after a cap is removed)

From this state, when the first movable operating members 52c operate, the operating piece 52a on one side (the left side in FIG. 7) moves downward and the operating piece 52a on the other side (the right side in FIG. 7) moves upward as illustrated in FIG. 7. With movement of these operating pieces 52a, the cap 103 rotates counterclockwise, and as a result, the cap 103 is removed from the plastic bottle body 101.

In this case, since the contact portions 52b of the operating pieces 52a are formed in a convex-concave shape, the contact portions 52b rarely slide on the cap 103. Due to this, with movement of the operating pieces 52a, the cap 103 rotates reliably in relation to the plastic bottle body 101 and the cap 103 is removed from the plastic bottle body 101 efficiently.

After the cap 103 is removed from the plastic bottle body 101, the chuck member 51 and the cap removal operating member 52 return to their original positions. Moreover, the removed cap 103 is collected and stored in a cap storage portion (not illustrated) provided under the cap removing unit 5 of the apparatus body 10.

The plastic bottle 100 of which the cap 103 is removed is conveyed up to a position where the plastic bottle 100 passes through the label separating unit 5 by the third conveying member 24. When the plastic bottle 100 passes through the label separating unit 5, the label separating unit 5 performs the following operations on the plastic bottle 100.

First, when the plastic bottle 100 is conveyed up to the position of the label cutting member 61, as illustrated in FIG. 9, the blade portions 61a of the label cutting member 61 make contact with the body portion 101a of the plastic bottle 100. When the plastic bottle 100 is pressed toward the front side by the second pressing member 24c, the label cutting member 61 pivots while resisting against the biasing force of the biasing member 62 so that the blade portions 61a move toward the front side (the state indicated by two-dot chain lines in FIG. 9). That is, a state where the blade portions 61a are biased toward the rear side by the biasing force of the biasing member 62 and are pressed against the body portion 101a of the plastic bottle 100 by the biasing force is created.

In this manner, when the plastic bottle 100 passes through the position of the blade portions 61a while being pressed by the third conveying member 24 (see FIG. 8) in a state where the blade portions 61a of the label cutting member 61 are pressed against the body portion 101a, the label 102 of the plastic bottle 100 is cut by the blade portions 61a.

The cut label 102 often adheres to the body portion 101a of the plastic bottle body 101 due to static electricity or the like.

When the label 102 is cut by the blade portions 61a in this manner, only the label 102 can be cut without cutting the body portion 101a of the plastic bottle body 101. Thus, it is possible to cut the label 102 while preventing large force from being applied to the blade portions 61a.

Figure 11:
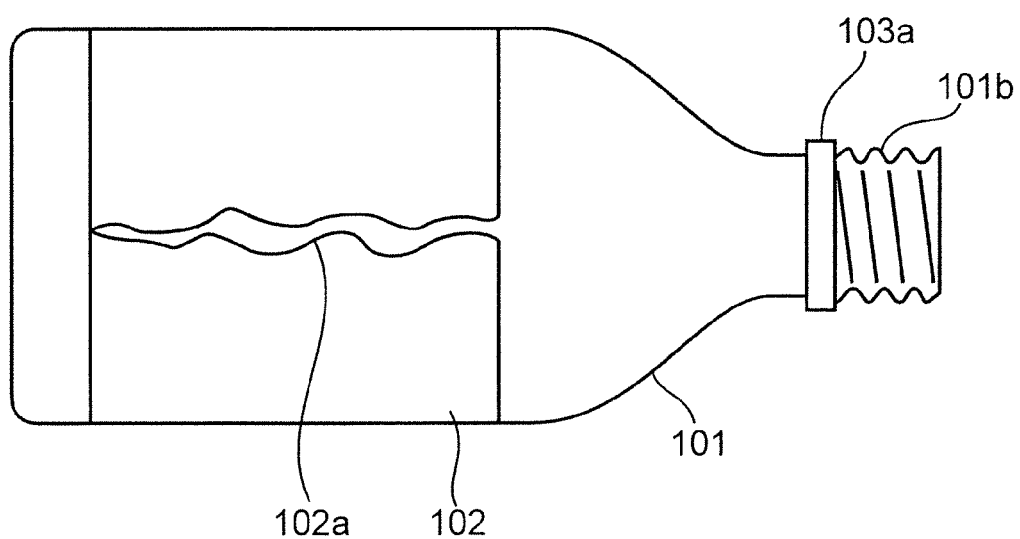
FIG. 11 is a side view of a plastic bottle in which a label is heated and deformed by the heating member.

After the label is cut, the plastic bottle 100 passes through the position of the heating member 63. When the plastic bottle 100 passes through the heating member 63, the heating member 63 emits hot air to the cut parts of the label 102. In this way, for example, as illustrated in FIG. 11, the cut parts of the label 102 are thermally contracted to curve in a wavy form and floats from the body portion 101a of the plastic bottle body 101.

After the plastic bottle 100 passes through the position of the heating member 63, the plastic bottle 100 passes through the position of the rotary brush members 64a to 64d. With this passing, the label 102 is scraped from the plastic bottle body 101 by the brush bristles 64f. As a result, the label 102 is separated from the plastic bottle body 101.

In this case, since the cut parts of the label 102 curve in a wavy form and float from the body portion 101a of the plastic bottle body 101, the brush bristles 64f of the rotary brush members 64a to 64d are easily caught at the label 102. Due to this, the label 102 is scraped easily and reliably. In particular, the brush bristles 64f are made from a synthetic resin such as nylon, the brush bristles 64f are very easily caught at the label 102, and the label 102 is scraped easily and reliably.

Moreover, when the plastic bottle 100 passes through the rotary brush members 64a to 64d, the plastic bottle 100 is also rotated by the first bottle guiding member 65a. Due to this, with interaction of rotation of the rotary brush members 64a to 64d and rotation of the plastic bottle 100, the label 102 is effectively scraped by the brush bristles 64f.

In this way, when the plastic bottle 100 passes through the label separating unit 5, the label 102 is separated from the plastic bottle body 101.

In the plastic bottle processing apparatus 1 of the present embodiment, although the label 102 is separated after the cap 103 is removed from the plastic bottle body 101, the cap 103 may be removed from the plastic bottle body 101 after the label 102 is separated.

After the label 102 is removed from the plastic bottle body 101, the plastic bottle body 101 is conveyed from the label separating unit 5 up to a position where the plastic bottle body 101 passes through the segmenting unit 7 by the fourth conveying member 25.

When the plastic bottle body 101 passes through the segmenting unit 7, the plastic bottle body 101 is segmented into two parts along the axial direction by the segmenting wheel 72.

Specifically, when the plastic bottle body 101 is conveyed up to the segmenting unit 7, the first movement operating member 73 operates and the opening portion 101b of the plastic bottle body 101 including the cap ring 103a is sandwiched by the sandwiching pieces 71a.

After that, the second movement operating member 74 operates, and the sandwiching pieces 71a move along the conveying direction of the second conveying path part 22 with conveying of the plastic bottle body 101 by the fourth conveying member 25.

When the plastic bottle body 101 passes through the position of the segmenting wheel 72, the plastic bottle body 101 is segmented into two parts in the axial direction by the segmenting wheel 72. In this case, since the cap ring 103a is sandwiched by the sandwiching pieces 71a, the cap ring 103a is also cut approximately equally into two parts at the same time. Due to this, the cap ring 103a is removed from the plastic bottle body 101.

After the cap ring 103a is removed and the plastic bottle body 101 is segmented into two parts, the plastic bottle body 101 is conveyed to the shredding unit 8 in a state of being carried on the belt 26a of the fifth conveying member 26.

The plastic bottle body 101 conveyed to the shredding unit 8 is shredded in sizes of 10 mm or smaller by the rotary blade member 82 and the fixed blade 81a.

Figure 20:
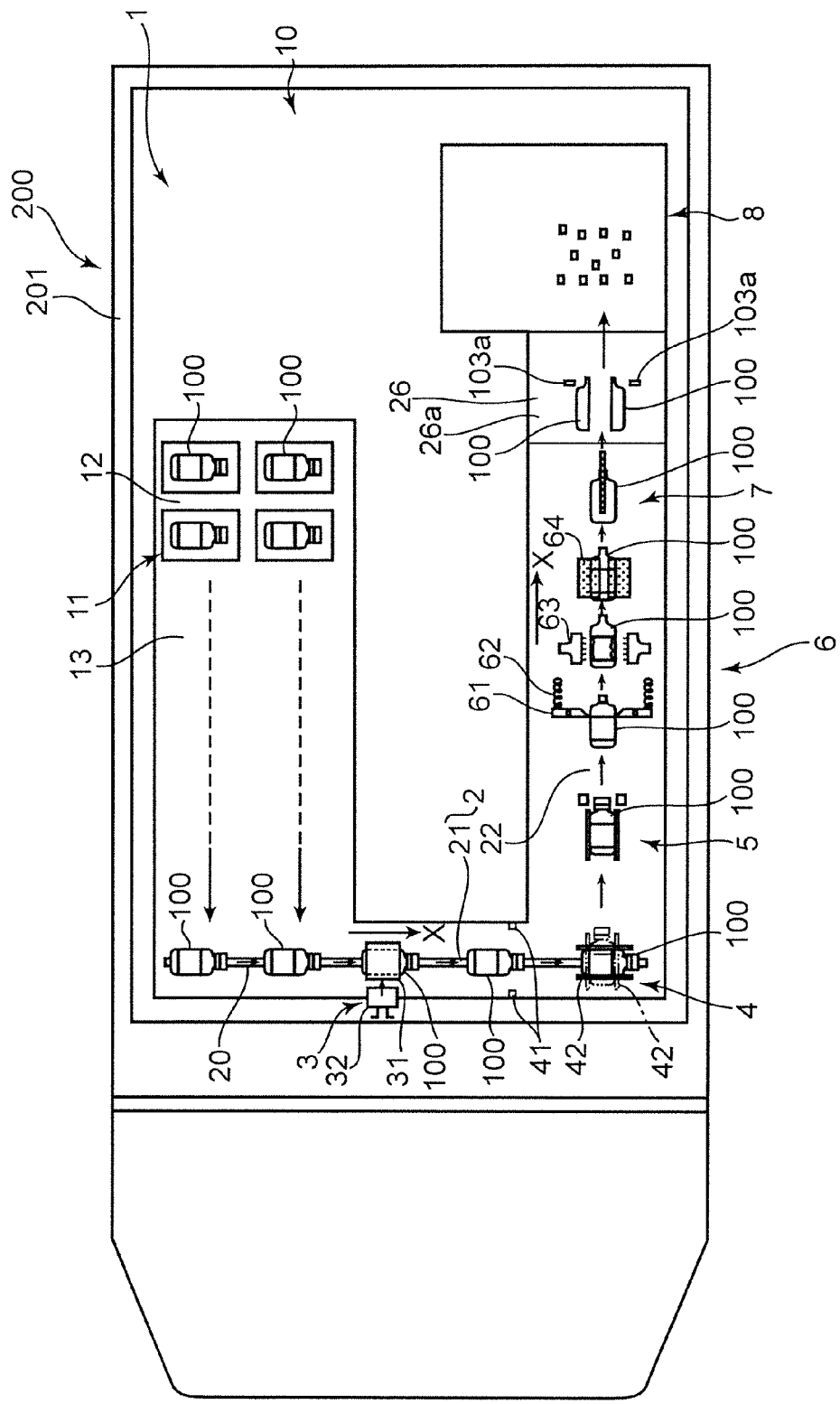
FIG. 20 is a plan view of a vehicle having the plastic bottle processing apparatus mounted thereon.

In the present embodiment, the plastic bottle processing apparatus 1 having the configuration described above is used by being mounted on a carrier 201 as illustrated in FIG. 20. In this way, a plastic bottle processing apparatus mount vehicle 200 is obtained.

Specifically, the plastic bottle processing apparatus mount vehicle 200 includes the carrier 201 and the plastic bottle processing apparatus 1. The carrier 201 is a truck having the maximum load of 2 tons, for example. The plastic bottle processing apparatus 1 is mounted on the bed of the carrier 201.

In the embodiment, although the plastic bottle processing apparatus 1 is mounted on the carrier 201 so as to be moved by the carrier 201, the invention is not limited to this and various changes can be made. For example, the plastic bottle processing apparatus 1 may be used by being fixed on the ground of a waste processing factory and the like.

The plastic bottle processing apparatus 1 and the plastic bottle processing apparatus mount vehicle 200 are examples of preferred embodiments of the plastic bottle processing apparatus and the plastic bottle processing apparatus mount vehicle according to the present invention, and specific configurations thereof may be appropriately changed without departing from the spirit of the present invention.

The present invention can be summarized as below.

The present invention provides a plastic bottle processing apparatus that processes a plastic bottle including a plastic bottle body having a label wound thereon and a cap screwed to the plastic bottle body, including: an apparatus body having a conveying path section in which the plastic bottle is conveyed along a predetermined conveying direction; and a label separating unit arranged in a middle of the conveying path section so as to separate the label from the plastic bottle body, wherein the conveying path section allows the plastic bottle to be conveyed in a state where an axial direction of the plastic bottle is parallel to the conveying direction, and the label separating unit includes: a label cutting member that cuts the label of the plastic bottle, which is conveyed in the conveying path section along the axial direction of the plastic bottle; a heating member that heats the label cut by the label cutting member; and a brush member disposed so as to be able to make contact with the label heated by the heating member and remove the label from the plastic bottle body by making contact with the label.

According to this configuration, since the heating member heats a portion or the entire portion of the label cut by the label cutting member, it is possible to contract and deform a portion or an entire portion of the label. Due to this, even when the cut label adheres to the outer circumferential surface of the plastic bottle body due to static electricity, it is possible to allow a portion or an entire portion of the label to float from the outer circumferential surface of the plastic bottle body. Thus, when the brush member makes contact with the floating label, the brush member is easily caught at the label, and the label can be removed from the plastic bottle body more reliably.

The plastic bottle processing apparatus may preferably include a rotating device that causes the plastic bottle body and the brush member to rotate relative to each other in a state where the plastic bottle body and the brush member are in contact with each other.

According to this configuration, it is possible to separate the label from the plastic bottle body more effectively.

In this case, the brush member is preferably a rotary brush member including a shaft portion extending along the axial direction of the plastic bottle body and a brush bristle arranged on an outer circumference of the shaft portion, and the rotating device preferably rotates the rotary brush member by applying rotational driving force to the shaft portion.

According to this configuration, since the brush bristle can make contact with the floating portions (cut parts) of the label continuously and repeatedly as a result of rotation of the rotary brush member, the label is easily separated from the plastic bottle body. Thus, it is possible to remove the label from the plastic bottle body more reliably with a simple configuration.

In the plastic bottle processing apparatus, the brush bristle may be arranged in a spiral form along the axial direction of the shaft portion.

According to this configuration, the brush bristles can remove the label from the plastic bottle body further more reliably as a result of rotation of the rotary brush member.

In the plastic bottle processing apparatus, the heating member preferably emits hot air to cut parts of the label cut by the label cutting member.

According to this configuration, since hot air enters between the cut parts of the label, the label can be thermally deformed (floated) more effectively. Thus, it is possible to remove the label more smoothly with the brush member.

In the plastic bottle processing apparatus, the label cutting member is preferably provided so as to be displaced between a cutting position at which the label cutting member enters the conveying path section and a retracted position located at a position further toward an outer side than the cutting position, and the label separating unit preferably includes a biasing member that biases the label cutting member toward the cutting position to cause the label cutting member to make contact with an outer circumferential surface of the plastic bottle body conveyed along the conveying path section.

According to this configuration, when the label cutting member makes contact with the outer circumferential surface of the plastic bottle body conveyed along the conveying path section, the label cutting member slides in relation to the outer circumferential surface of the plastic bottle body in a state of being pressed against the outer circumferential surface of the plastic bottle body, whereby the label is cut. Thus, it is possible to easily cut the label only without cutting the plastic bottle body.

In this case, the label cutting member may be supported on the apparatus body in a state of being pivotable about an axis perpendicular to the conveying direction of the plastic bottle and be disposed so as to be able to make contact with the plastic bottle body conveyed along the conveying path section, and moreover may make contact with the plastic bottle body to be pivoted and displaced from the cutting position to the retracted position.

According to this configuration, when the label cutting member makes contact with the outer circumferential surface of the plastic bottle body conveyed along the conveying path section, the label cutting member pivots toward the front side in the conveying direction of the plastic bottle body while being pressed against the outer circumferential surface of the plastic bottle body and slides in relation to the outer circumferential surface of the plastic bottle body with the conveying of the plastic bottle body in this state. Thus, it is possible to cut the label only with less resistance.

In this case, the label cutting member may include: a label cutting blade portion provided on one end of the label cutting member; a biasing member locking portion provided on the other end of the label cutting member; and a connecting portion provided between the blade portion and the locking portion and connected to the apparatus body, the label cutting member may be supported on the apparatus body so as to be pivotable about the connecting portion as the axis, and the label cutting member may be displaced from a position at which the blade portion enters the conveying path section to a position located on an outer side of the position at which the blade portion enters the conveying path section and on a front side in the conveying direction of the plastic bottle body, as a result of pivoting of the label cutting member from the cutting position to the retracted position.

According to this configuration, it is possible to cut the label smoothly with a simple configuration.

The plastic bottle processing apparatus may preferably include: a cap removing unit arranged in a middle of the conveying path section so as to remove the cap from the plastic bottle body, and the cap removing unit includes: a fixing member that fixes the plastic bottle body; and a cap operating member that applies rotational force to the cap screwed to the plastic bottle body fixed by the fixing member in order to remove the cap.

According to this configuration, when the plastic bottle having the cap screwed (attached) thereto is conveyed, the plastic bottle body is fixed by the fixing member and rotational force is applied to the cap by the cap operating member. As a result, the cap is removed from the plastic bottle body. Therefore, it is possible to automatically remove the cap from the plastic bottle body.

In the plastic bottle processing apparatus, the cap operating member may preferably include: a pair of operating pieces; a first driving member that moves the pair of operating pieces between a position at which the plastic bottle body is allowed to pass and a position at which the cap is sandwiched from both sides in a radial direction of the cap; and a second driving member that applies the rotational force to the cap by moving the pair of operating pieces, which sandwich the cap from both sides in the radial direction, in different directions perpendicular to the axial direction of the plastic bottle body.

According to this configuration, since the pair of operating pieces is moved between a position at which the plastic bottle body is allowed to pass and a position at which the cap is sandwiched from both sides in the radial direction, it is possible to remove the cap from the plastic bottle body efficiently without interfering conveying of the plastic bottle body.

Moreover, since the pair of operating pieces sandwiching the cap from both sides in the radial direction is moved in different directions perpendicular to the axial direction of the plastic bottle body thereby rotating the cap, it is possible to remove the cap with a relatively simple mechanism.

The pair of operating pieces each may preferably include a contact portion that is provided on a facing surface thereof so as to make contact with an outer circumferential surface of the cap, and the contact portion may preferably be formed in a convex-concave shape.

According to this configuration, since the contact portions of the operating pieces are formed in a convex-concave shape, it is possible to rotate the cap reliably with movement of the pair of operating pieces.

A vehicle mounted with the plastic bottle processing apparatus of the present invention includes the plastic bottle processing apparatus and a carrier on which the plastic bottle processing apparatus is mounted.

According to this plastic bottle processing apparatus mount vehicle, the plastic bottle processing apparatus can be moved to a desired place where the vehicle can travel, and the processes as described above (for example, a label removing process and a cap removing process) can be performed on the plastic bottle.

This application is based on Japanese Patent applications Nos. 2013-241657 and 2013-241658 filed in Japan Patent Office on Nov. 22, 2013, the contents of which are hereby incorporated by reference.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

The invention claimed is:

1. A plastic bottle processing apparatus that processes a plastic bottle including a plastic bottle body having a label wound thereon and a cap screwed to the plastic bottle body, comprising:
   an apparatus body having a conveying path section in which the plastic bottle is conveyed along a predetermined conveying direction; and
   a label separating unit arranged in a middle of the conveying path section so as to separate the label from the plastic bottle body,
   the conveying path section allowing the plastic bottle to be conveyed in a state where an axial direction of the plastic bottle is parallel to the conveying direction, and
   the label separating unit including:
   a label cutting member that cuts the label of the plastic bottle that is conveyed in the conveying path section along the axial direction of the plastic bottle, the label cutting member is provided so as to be displaced between a cutting position at which the label cutting member enters the conveying path section and a retracted position located on a position further toward an outer side than the cutting position;
   a biasing member that biases the label cutting member toward the cutting position to cause the label cutting member to make contact with an outer circumferential surface of the plastic bottle body conveyed along the conveying path section;
   a heating member that heats the label cut by the label cutting member;
   a brush member disposed so as to be able to make contact with the label heated by the heating member and remove the label from the plastic bottle body by making contact with the label, the brush member being a rotary brush member including a shaft portion extending along the axial direction of the plastic bottle body and a brush bristle arranged on an outer circumference of the shaft portion, the brush bristle being arranged in a spiral form along the axial direction of the shaft portion; and
   a rotating device that causes the plastic bottle body and the brush member to rotate relative to each other in a state where the plastic bottle body and the brush member are in contact with each other, the rotating device rotates the rotary brush member by applying rotational driving force to the shaft portion.

2. The plastic bottle processing apparatus according to claim 1, wherein
   the label cutting member is supported on the apparatus body in a state of being pivotable about an axis perpendicular to the conveying direction of the plastic bottle and is disposed so as to be able to make contact with the plastic bottle body conveyed along the conveying path section, and moreover makes contact with the plastic bottle body to be pivoted and displaced from the cutting position to the retracted position.

3. The plastic bottle processing apparatus according to claim 2, wherein
   the label cutting member includes:
   a label cutting blade portion provided on one end of the label cutting member;
   a biasing member locking portion provided on the other end of the label cutting member; and
   a connecting portion provided between the blade portion and the locking portion and connected to the apparatus body,
   the label cutting member is supported on the apparatus body so as to be pivotable about the connecting portion as the axis, and
   the label cutting member is displaced from a position at which the blade portion enters the conveying path section to a position located on an outer side of the position at which the blade portion enters the conveying path section and on a front side in the conveying direction of the plastic bottle body, as a result of pivoting of the label cutting member from the cutting position to the retracted position.

4. The plastic bottle processing apparatus according to claim 3, further comprising:
   a cap removing unit arranged in a middle of the conveying path section so as to remove the cap from the plastic bottle body, wherein
   the cap removing unit includes:
   a fixing member that fixes the plastic bottle body; and
   a cap operating member that applies rotational force to the cap screwed to the plastic bottle body fixed by the fixing member in order to remove the cap.

5. The plastic bottle processing apparatus according to claim 4, wherein
   the cap operating member includes:
   a pair of operating pieces;
   a first driving member that moves the pair of operating pieces between a position at which the plastic bottle body is allowed to pass and a position at which the cap is sandwiched from both sides in a radial direction of the cap; and
   a second driving member that applies the rotational force to the cap by moving the pair of operating pieces, which sandwich the cap from both sides in the radial direction, in different directions perpendicular to the axial direction of the plastic bottle body.

6. The plastic bottle processing apparatus according to claim 5, wherein
   the pair of operating pieces each includes a contact portion that is provided on a facing surface thereof so as to make contact with an outer circumferential surface of the cap, and
   the contact portion is formed in a convex-concave shape.

7. The plastic bottle processing apparatus according to claim 1, wherein
   the heating member emits hot air to cut parts of the label cut by the label cutting member.

8. The plastic bottle processing apparatus according to claim 1, further comprising:
   a cap removing unit arranged in a middle of the conveying path section so as to remove the cap from the plastic bottle body, wherein
   the cap removing unit includes:
   a fixing member that fixes the plastic bottle body; and
   a cap operating member that applies rotational force to the cap screwed to the plastic bottle body fixed by the fixing member in order to remove the cap.

9. The plastic bottle processing apparatus according to claim 8, wherein
   the cap operating member includes:
   a pair of operating pieces;
   a first driving member that moves the pair of operating pieces between a position at which the plastic bottle body is allowed to pass and a position at which the cap is sandwiched from both sides in a radial direction of the cap; and
   a second driving member that applies the rotational force to the cap by moving the pair of operating pieces, which sandwich the cap from both sides in the radial direction, in different directions perpendicular to the axial direction of the plastic bottle body.

10. The plastic bottle processing apparatus according to claim 9, wherein
the pair of operating pieces each includes a contact portion that is provided on a facing surface thereof so as to make contact with an outer circumferential surface of the cap, and
the contact portion is formed in a convex-concave shape.

11. A plastic bottle processing apparatus that processes a plastic bottle including a plastic bottle body having a label wound thereon and a cap screwed to the plastic bottle body, comprising:
an apparatus body having a conveying path section in which the plastic bottle is conveyed along a predetermined conveying direction; and
a label separating unit arranged in a middle of the conveying path section so as to separate the label from the plastic bottle body,
the conveying path section allowing the plastic bottle to be conveyed in a state where an axial direction of the plastic bottle is parallel to the conveying direction, and
the label separating unit including:
a label cutting member that cuts the label of the plastic bottle, which is conveyed in the conveying path section along the axial direction of the plastic bottle, the label cutting member being provided so as to be displaced between a cutting position at which the label cutting member enters the conveying path section and a retracted position located on a position further toward an outer side than the cutting position,
a heating member that heats the label cut by the label cutting member,
a brush member disposed so as to be able to make contact with the label heated by the heating member and remove the label from the plastic bottle body by making contact with the label, and
a biasing member that biases the label cutting member toward the cutting position to cause the label cutting member to make contact with an outer circumferential surface of the plastic bottle body conveyed along the conveying path section.

12. The plastic bottle processing apparatus according to claim 11, further comprising:
a rotating device that causes the plastic bottle body and the brush member to rotate relative to each other in a state where the plastic bottle body and the brush member are in contact with each other.

13. The plastic bottle processing apparatus according to claim 12, wherein
the brush member is a rotary brush member including a shaft portion extending along the axial direction of the plastic bottle body and a brush bristle arranged on an outer circumference of the shaft portion, and
the rotating device rotates the rotary brush member by applying rotational driving force to the shaft portion.

14. The plastic bottle processing apparatus according to claim 13, wherein
the brush bristle is arranged in a spiral form along the axial direction of the shaft portion.

15. The plastic bottle processing apparatus according to claim 14, wherein
the heating member emits hot air to cut parts of the label cut by the label cutting member.

16. The plastic bottle processing apparatus according to claim 11, wherein
the label cutting member is supported on the apparatus body in a state of being pivotable about an axis perpendicular to the conveying direction of the plastic bottle and is disposed so as to be able to make contact with the plastic bottle body conveyed along the conveying path section, and moreover makes contact with the plastic bottle body to be pivoted and displaced from the cutting position to the retracted position.

17. The plastic bottle processing apparatus according to claim 16, wherein
the label cutting member includes:
a label cutting blade portion provided on one end of the label cutting member;
a biasing member locking portion provided on the other end of the label cutting member; and
a connecting portion provided between the blade portion and the locking portion and connected to the apparatus body,
the label cutting member is supported on the apparatus body so as to be pivotable about the connecting portion as the axis, and
the label cutting member is displaced from a position at which the blade portion enters the conveying path section to a position located on an outer side of the position at which the blade portion enters the conveying path section and on a front side in the conveying direction of the plastic bottle body, as a result of pivoting of the label cutting member from the cutting position to the retracted position.

18. A vehicle mounted with a plastic bottle processing apparatus, comprising:
a carrier; and
a plastic bottle processing apparatus mounted on the carrier, and adapted for processing a plastic bottle including a plastic bottle body having a label wound thereon and a cap screwed to the plastic bottle body, and comprising:
an apparatus body having a conveying path section in which the plastic bottle is conveyed along a predetermined conveying direction; and
a label separating unit arranged in a middle of the conveying path section so as to separate the label from the plastic bottle body,
the conveying path section allowing the plastic bottle to be conveyed in a state where an axial direction of the plastic bottle is parallel to the conveying direction, and
the label separating unit including:
a label cutting member that cuts the label of the plastic bottle that is conveyed in the conveying path section along the axial direction of the plastic bottle, the label cutting member being provided so as to be displaced between a cutting position at which the label cutting member enters the conveying path section and a retracted position located on a position further toward an outer side than the cutting position;
a heating member that heats the label cut by the label cutting member;
a brush member disposed so as to be able to make contact with the label heated by the heating member and remove the label from the plastic bottle body by making contact with the label; and
a biasing member that biases the label cutting member toward the cutting position to cause the label cutting member to make contact with an outer circumferential surface of the plastic bottle body conveyed along the conveying path section.

* * * * *